US009083925B2

(12) United States Patent
Shimada et al.

(10) Patent No.: US 9,083,925 B2
(45) Date of Patent: Jul. 14, 2015

(54) IMAGE PROCESSING APPARATUS AND METHOD THEREFOR

(71) Applicant: CANON KABUSHIKI KAISHA, Tokyo (JP)

(72) Inventors: Takuya Shimada, Kawasaki (JP); Akira Shibasaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/899,302

(22) Filed: May 21, 2013

(65) Prior Publication Data

US 2013/0321872 A1 Dec. 5, 2013

(30) Foreign Application Priority Data

May 31, 2012 (JP) ................................ 2012-125142

(51) Int. Cl.
*H04N 1/405* (2006.01)
*H04N 1/60* (2006.01)

(52) U.S. Cl.
CPC ........... *H04N 1/6097* (2013.01); *H04N 1/6016* (2013.01); *H04N 1/6061* (2013.01)

(58) Field of Classification Search
CPC .............. G06K 15/1878; G06K 15/02; G06K 15/1881; G06K 15/027; G06K 2215/0094; G06K 15/129; H04N 1/60; H04N 1/6033; H04N 1/405; H04N 1/46; H04N 1/54; H04N 1/52; H04N 1/6058; H04N 1/6027; H04N 1/00045; H04N 1/56; H04N 1/00087
USPC ........................ 358/1.9, 2.1, 3.06–3.09, 3.14, 358/3.16–3.18, 3.24, 468
See application file for complete search history.

(56) References Cited

U.S. PATENT DOCUMENTS

| | | | |
|---|---|---|---|
| 7,003,151 | B2 | 2/2006 | Shimada |
| 7,258,412 | B2 | 8/2007 | Maru et al. |
| 7,420,705 | B2 | 9/2008 | Yamada et al. |
| 7,450,281 | B2 | 11/2008 | Torigoe et al. |
| 7,453,602 | B2 | 11/2008 | Shimada |
| 7,755,795 | B2 | 7/2010 | Shimada |
| 7,791,760 | B2 | 9/2010 | Shimada |
| 8,376,502 | B2 | 2/2013 | Ochiai et al. |
| 2010/0245873 | A1 | 9/2010 | Shimada |
| 2012/0044510 | A1 | 2/2012 | Shimada |

FOREIGN PATENT DOCUMENTS

| | | | |
|---|---|---|---|
| JP | 06-233126 | A | 8/1994 |
| JP | 2005-088579 | A | 4/2005 |

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

Image processing is performed for an image recording apparatus which records an image by arranging, on a recording medium, dots of a plurality of types of dot structures having different arrangements of color materials to be used. A dot arrangement signal which corresponds to an input color signal and represents the arrangement of dots of the plurality of types of dot structures is generated. Image data which arranges dots of the plurality of types of dot structures on a recording medium based on the dot arrangement signal is output.

4 Claims, 24 Drawing Sheets

GAMUT STRUCTURE SET
- SURFACE STRUCTURE SET (CORRESPONDING TO SURFACE POLYGON 1 OF GAMUT)
  - DOT STRUCTURE A
  - DOT STRUCTURE B
  - DOT STRUCTURE C
- SURFACE STRUCTURE SET (CORRESPONDING TO SURFACE POLYGON 2 OF GAMUT)
  - DOT STRUCTURE B
  - DOT STRUCTURE C
  - DOT STRUCTURE E
  - DOT STRUCTURE F
- SURFACE STRUCTURE SET (CORRESPONDING TO SURFACE POLYGON 3 OF THE GAMUT)
  - .
  - .
  - .
  - .

FIG. 2A
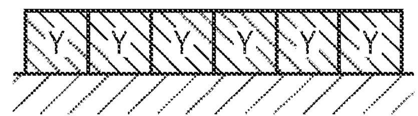
FIG. 2B
K K K K K K
FIG. 2C
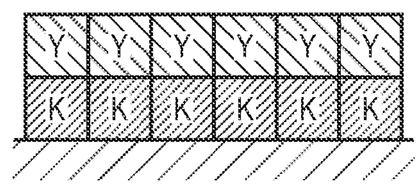
FIG. 2D
K Y K Y K Y
FIG. 2E
FIG. 2F
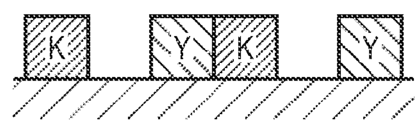

L/2

REGION B (m + 1)TH
MAIN SCANNING

REGION A

808

802

L mTH
MAIN SCANNING

F I G. 9A
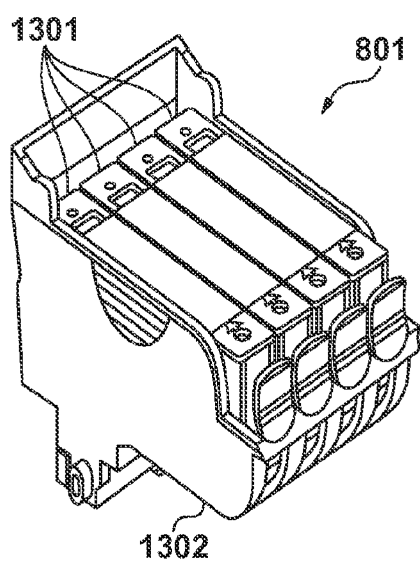
F I G. 9B
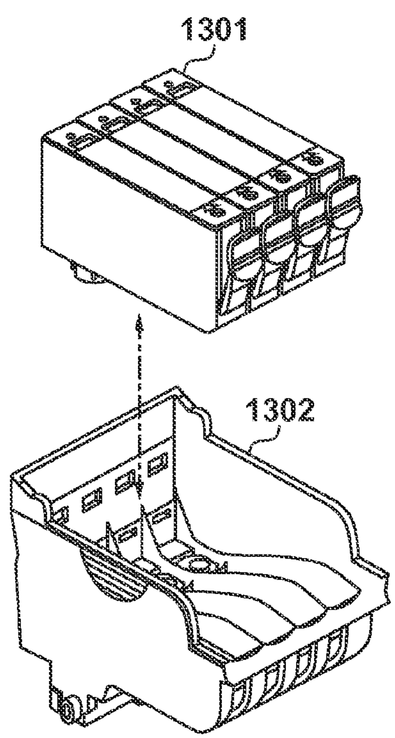

FIG. 13A

| W | Y/C | W | Y |
|---|---|---|---|
| Y | W | Y/C | W |
| W | Y/C | W | Y |
| Y | W | Y/C | W |

| 1 | 0 | 1 | 0 |
|---|---|---|---|
| 0 | 1 | 0 | 1 |
| 1 | 0 | 1 | 0 |
| 0 | 1 | 0 | 1 |

| 0 | 0 | 0 | 1 |
|---|---|---|---|
| 1 | 0 | 0 | 0 |
| 0 | 0 | 0 | 1 |
| 1 | 0 | 0 | 0 |

| 0 | 1 | 0 | 0 |
|---|---|---|---|
| 0 | 0 | 1 | 0 |
| 0 | 1 | 0 | 0 |
| 0 | 0 | 1 | 0 |

FIG. 13E

OTHERS

| 0 | 0 | 0 | 0 |
|---|---|---|---|
| 0 | 0 | 0 | 0 |
| 0 | 0 | 0 | 0 |
| 0 | 0 | 0 | 0 |

FIG. 14A

| | FIRST PASS | | | | SECOND PASS | | | | THIRD PASS | | | | FOURTH PASS | | | |
|---|---|---|---|---|---|---|---|---|---|---|---|---|---|---|---|---|
| | C | M | Y | K | C | M | Y | K | C | M | Y | K | C | M | Y | K |
| W | M0 | M0 | M0 | M0 | M0 | M0 | M0 | M0 | M0 | M0 | M0 | M0 | M0 | M0 | M0 | M0 |
| K | M0 | M0 | M0 | M4-1 | M0 | M0 | M0 | M4-2 | M0 | M0 | M0 | M4-3 | M0 | M0 | M0 | M4-4 |
| Y | M0 | M0 | M4-1 | M0 | M0 | M0 | M4-2 | M0 | M0 | M0 | M4-3 | M0 | M0 | M0 | M4-4 | M0 |
| Y/C | M2-1 | M0 | M0 | M0 | M2-2 | M0 | M0 | M0 | M0 | M0 | M2-1 | M0 | M0 | M0 | M2-2 | M0 |
| C/Y | M0 | M0 | M2-1 | M0 | M0 | M0 | M2-2 | M0 | M2-1 | M0 | M0 | M0 | M2-2 | M0 | M0 | M0 |
| C | M4-1 | M0 | M0 | M0 | M4-2 | M0 | M0 | M0 | M4-3 | M0 | M0 | M0 | M4-4 | M0 | M0 | M0 |
| C/M | M0 | M2-1 | M0 | M0 | M0 | M2-2 | M0 | M0 | M2-1 | M0 | M0 | M0 | M2-2 | M0 | M0 | M0 |
| M/C | M2-1 | M0 | M0 | M0 | M2-2 | M0 | M0 | M0 | M0 | M2-1 | M0 | M0 | M0 | M2-2 | M0 | M0 |
| M | M0 | M4-1 | M0 | M0 | M0 | M4-2 | M0 | M0 | M0 | M4-3 | M0 | M0 | M0 | M4-4 | M0 | M0 |
| M/Y | M0 | M0 | M2-1 | M0 | M0 | M0 | M2-2 | M0 | M0 | M2-2 | M0 | M0 | M0 | M2-2 | M0 | M0 |
| Y/M | M0 | M2-1 | M0 | M0 | M0 | M2-2 | M0 | M0 | M0 | M0 | M2-1 | M0 | M0 | M0 | M2-2 | M0 |

| | | | |
|---|---|---|---|
| 1 | 0 | 1 | 0 |
| 0 | 0 | 0 | 0 |
| 0 | 1 | 0 | 1 |
| 0 | 0 | 0 | 0 |

M4-2

| | | | |
|---|---|---|---|
| 0 | 0 | 0 | 0 |
| 0 | 1 | 0 | 1 |
| 0 | 0 | 0 | 0 |
| 1 | 0 | 1 | 0 |

M4-3

| | | | |
|---|---|---|---|
| 0 | 1 | 0 | 1 |
| 0 | 0 | 0 | 0 |
| 1 | 0 | 1 | 0 |
| 0 | 0 | 0 | 0 |

M4-4

| | | | |
|---|---|---|---|
| 0 | 0 | 0 | 0 |
| 1 | 0 | 1 | 0 |
| 0 | 0 | 0 | 0 |
| 0 | 1 | 0 | 1 |

M2-1

| | | | |
|---|---|---|---|
| 1 | 0 | 1 | 0 |
| 0 | 1 | 0 | 1 |
| 1 | 0 | 1 | 0 |
| 0 | 1 | 0 | 1 |

M2-2

| | | | |
|---|---|---|---|
| 0 | 1 | 0 | 1 |
| 1 | 0 | 1 | 0 |
| 0 | 1 | 0 | 1 |
| 1 | 0 | 1 | 0 |

M0

| | | | |
|---|---|---|---|
| 0 | 0 | 0 | 0 |
| 0 | 0 | 0 | 0 |
| 0 | 0 | 0 | 0 |
| 0 | 0 | 0 | 0 |

FIG. 15A

FIRST PASS OF Y

| | | | |
|---|---|---|---|
| 0 | 0 | 0 | 0 |
| 0 | 0 | 0 | 0 |
| 0 | 0 | 0 | 1 |
| 0 | 0 | 0 | 0 |

FIG. 15B

SECOND PASS OF Y

| | | | |
|---|---|---|---|
| 0 | 0 | 0 | 0 |
| 0 | 0 | 0 | 0 |
| 0 | 0 | 0 | 0 |
| 1 | 0 | 0 | 0 |

FIG. 15C

THIRD PASS OF Y

| | | | |
|---|---|---|---|
| 0 | 0 | 0 | 1 |
| 0 | 0 | 0 | 0 |
| 0 | 0 | 0 | 0 |
| 0 | 0 | 0 | 0 |

FIG. 15D

FOURTH PASS OF Y

| | | | |
|---|---|---|---|
| 0 | 1 | 0 | 0 |
| 1 | 0 | 1 | 0 |
| 0 | 1 | 0 | 0 |
| 0 | 0 | 1 | 0 |

FIG. 15E

FIRST PASS OF C

| | | | |
|---|---|---|---|
| 0 | 0 | 0 | 0 |
| 0 | 0 | 0 | 0 |
| 0 | 0 | 0 | 0 |
| 0 | 0 | 0 | 0 |

FIG. 15F

SECOND PASS OF C

| | | | |
|---|---|---|---|
| 0 | 1 | 0 | 0 |
| 0 | 0 | 1 | 0 |
| 0 | 1 | 0 | 0 |
| 0 | 0 | 1 | 0 |

FIG. 15G

THIRD PASS OF C

| | | | |
|---|---|---|---|
| 0 | 0 | 0 | 0 |
| 0 | 0 | 0 | 0 |
| 0 | 0 | 0 | 0 |
| 0 | 0 | 0 | 0 |

FIG. 15H

FOURTH PASS OF C

| | | | |
|---|---|---|---|
| 0 | 0 | 0 | 0 |
| 0 | 0 | 0 | 0 |
| 0 | 0 | 0 | 0 |
| 0 | 0 | 0 | 0 |

FIG. 17

| R″ | G″ | B″ | W | K | Y | Y/C | C/Y | C | C/M | M/C | M | M/Y | Y/M |
|---|---|---|---|---|---|---|---|---|---|---|---|---|---|
| 0 | 0 | 0 | 0 | 1 | 0 | 0 | 0 | 0 | 0 | 0 | 0 | 0 | 0 |
| · | · | · | · | · | · | · | · | · | · | · | · | · | · |
| · | · | · | · | · | · | · | · | · | · | · | · | · | · |
| 0 | 255 | 0 | 0 | 0 | 0 | 0.5 | 0.5 | 0 | 0 | 0 | 0 | 0 | 0 |
| · | · | · | · | · | · | · | · | · | · | · | · | · | · |
| · | · | · | · | · | · | · | · | · | · | · | · | · | · |
| 0 | 255 | 255 | 0 | 0 | 0 | 0 | 0 | 1 | 0 | 0 | 0 | 0 | 0 |
| · | · | · | · | · | · | · | · | · | · | · | · | · | · |
| · | · | · | · | · | · | · | · | · | · | · | · | · | · |
| 255 | 255 | 0 | 0 | 0 | 1 | 0 | 0 | 0 | 0 | 0 | 0 | 0 | 0 |
| · | · | · | · | · | · | · | · | · | · | · | · | · | · |
| · | · | · | · | · | · | · | · | · | · | · | · | · | · |
| 255 | 255 | 255 | 1 | 0 | 0 | 0 | 0 | 0 | 0 | 0 | 0 | 0 | 0 |

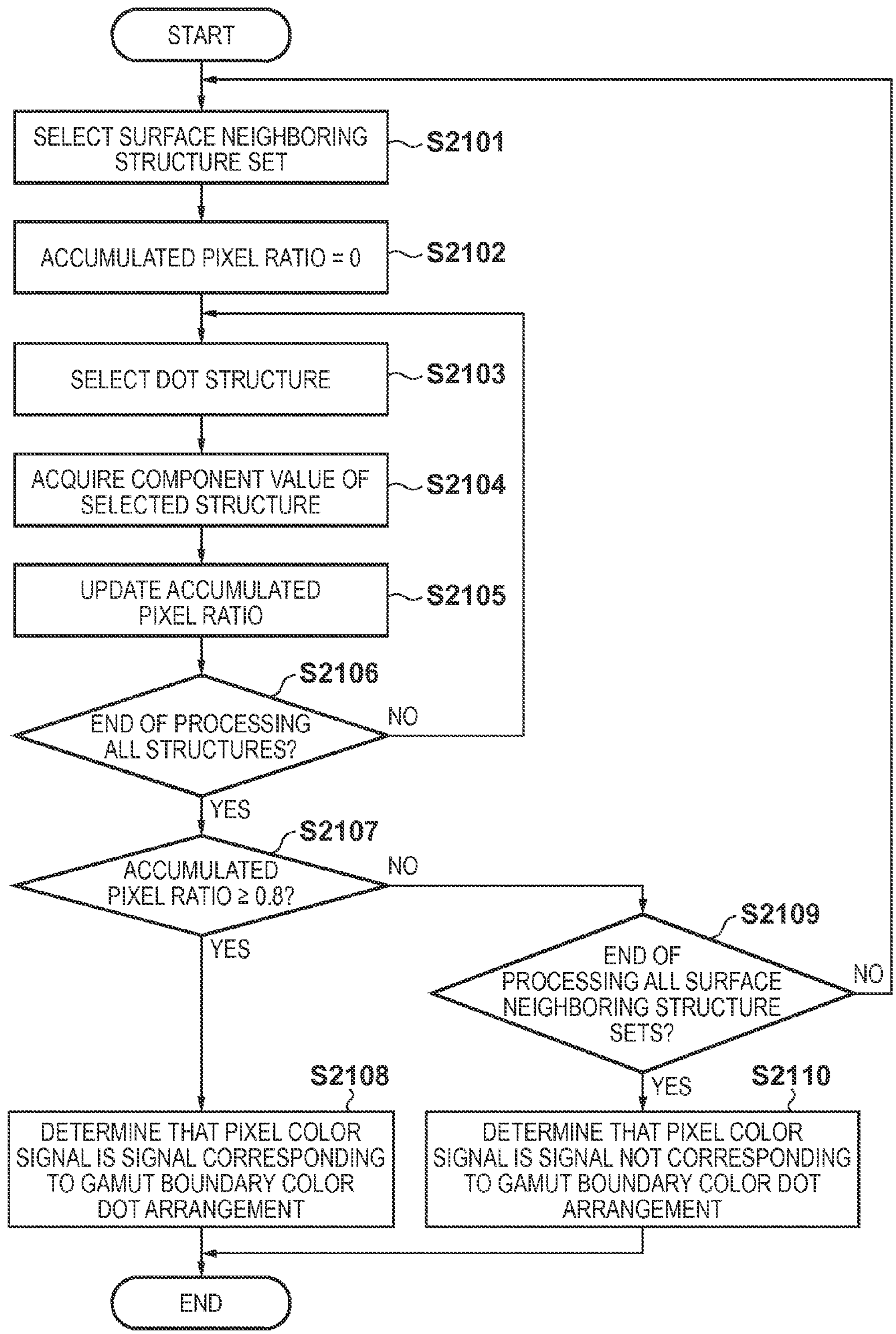
F I G. 22
START
SELECT SURFACE NEIGHBORING STRUCTURE SET
S2101
ACCUMULATED PIXEL RATIO = 0
S2102
SELECT DOT STRUCTURE
S2103
ACQUIRE COMPONENT VALUE OF SELECTED STRUCTURE
S2104
UPDATE ACCUMULATED PIXEL RATIO
S2105
S2106
END OF PROCESSING ALL STRUCTURES?
NO
YES
S2107
ACCUMULATED PIXEL RATIO ≥ 0.8?
NO
YES
S2109
END OF PROCESSING ALL SURFACE NEIGHBORING STRUCTURE SETS?
NO
YES
S2108
DETERMINE THAT PIXEL COLOR SIGNAL IS SIGNAL CORRESPONDING TO GAMUT BOUNDARY COLOR DOT ARRANGEMENT
S2110
DETERMINE THAT PIXEL COLOR SIGNAL IS SIGNAL NOT CORRESPONDING TO GAMUT BOUNDARY COLOR DOT ARRANGEMENT
END

IMAGE PROCESSING APPARATUS AND METHOD THEREFOR

BACKGROUND OF THE INVENTION

1. Field of the Invention

The present invention relates to image processing for an image recording apparatus which records a color image on a recording medium.

2. Description of the Related Art

In general, a color printer is requested to have an ability to record a larger number of colors. As a technique for widening the color gamut and implementing good color development, the following techniques are known.

First, there is a technique using color materials of particular colors such as red, green, and blue, in addition to those of cyan, magenta, yellow, and black. This technique widens the red color region in the printer not by recording a dot of the magenta color material and that of the yellow color material to overlap each other, but by recording a dot of the red color material different in color development from these color materials.

Also, there is a technique of controlling the dot arrangement so that dots of color materials of particular colors do not overlap those of color materials of other colors as much as possible. If dots of particular colors overlap those of other colors, the color development of the particular colors is impaired. Hence, the dot arrangement is controlled so that these dots do not overlap each other, thereby avoiding the appearance of a dot arrangement with poor color development and implementing a wider color gamut.

However, the technique using color materials of particular colors inevitably increases the cost and apparatus size because additional color materials need to be mounted in the printer. The technique of controlling the dot arrangement cannot obtain the effect of widening the color gamut when the color development of a particular color itself is poor or when the color development of a dot (to be referred to as an "overlapping dot" hereinafter) at which a color material of a particular color and that of another color overlap each other is good.

Further, when a dot of a particular color and that of another color are arranged not to overlap each other, dots of other colors readily overlap each other. The color gamut may become narrow depending on the characteristics of the color material and recording medium.

SUMMARY OF THE INVENTION

In one aspect, a color processing apparatus for performing image processing for an image recording apparatus which records an image by arranging, on a recording medium, dots of a plurality of types of dot structures having different arrangements of color materials to be used, comprising: a generation unit configured to generate a dot arrangement signal which corresponds to an input color signal and represents an arrangement of dots of the plurality of types of dot structures; and an outputting unit configured to output image data which arranges dots of the plurality of types of dot structures on a recording medium based on the dot arrangement signal, wherein, in a case where a set of dot structures recordable by the image recording apparatus is defined as a set A, a set of color points corresponding to the respective dot structures of the set A is defined as a set B, a polyhedron forming a convex hull of the color points of the set B in a color space is defined as a polyhedron C, a set of polygons forming a surface of the polyhedron C is defined as a set D, and a set of dot structures in which color points are positioned on the polygons of the set D out of the dot structures of the set A is defined as a set E, the dot arrangement signal out of the dot arrangement signals that corresponds to a color signal value representing a color capable of output on a gamut boundary represents an arrangement of dot structures serving as a subset of the set E.

According to the aspect, image processing for recording an image in a wider color gamut becomes possible without adding a new color material.

Further features of the present invention will become apparent from the following description of exemplary embodiments with reference to the attached drawings.

BRIEF DESCRIPTION OF THE DRAWINGS

FIGS. 2A to 2F are views exemplifying the arrangements of color dots in a plurality of pixels.

FIGS. 9A and 9B are views showing the structure of a printhead.

FIGS. 13A to 13E are views showing a binary image generation method.

FIGS. 14A and 14B are views showing pass masks.

FIGS. 15A to 15H are views exemplifying pass separation results.

FIG. 17 is a table exemplifying a pixel color conversion table.

FIG. 22 is a flowchart showing determination processing of whether a pixel color signal corresponds to a gamut boundary dot arrangement in the second embodiment.

DESCRIPTION OF THE EMBODIMENTS

Preferred embodiments of the present invention will now be described with reference to the accompanying drawings. It is to be understood that the following embodiments are not intended to limit inventions defined by the claims of the invention, and that not all combinations of features described in the embodiments are indispensable for the means to solve the problems according to the present invention.

First Embodiment

Dot Arrangement of Color of Gamut Boundary

Prior to a description of the embodiment, dot arrangement conditions for implementing a wide color gamut will be explained. Note that the dot is a minimum unit when recording a color material on a recording medium. The color material is typically ink or toner. In the following description, the arrangement of a color material in one pixel on a recording medium will be called a "dot structure" or simply "structure". The dot structure is expressed as the presence of a color material of one color, overlapping of color materials of a plurality of colors, or the absence of a color material. The pixel is a control unit in image processing, and indicates a small region forming an image (including a recording image). The recording medium is typically printing paper.

Figures 1A, 1B, 1C:
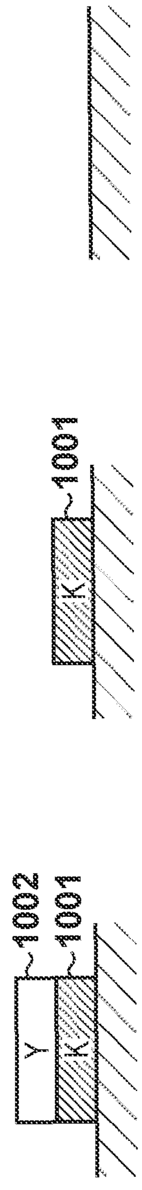
FIGS. 1A to 1C are views exemplifying color material overlapping structures.

FIGS. 1A to 1C are views exemplifying dot structures. In FIGS. 1A to 1C, a K dot 1001 is a dot of a color material of black K, and a Y dot 1002 is a dot of a color material of yellow Y. FIG. 1A shows a structure in which the Y dot is arranged to overlap the K dot. FIG. 1B shows a structure in which the K dot is singly arranged. FIG. 1C shows a structure in which neither dot is arranged (to be referred to as a "background structure" hereinafter).

FIGS. 2A to 2F are views exemplifying dot arrangements in a plurality of pixels, and exemplify combinations of dot arrangements in six pixels. FIG. 2A shows a dot arrangement in which all pixels have the single Y dot structure. FIG. 2B shows a dot arrangement in which all pixels have the single K dot structure. FIG. 2C shows a dot arrangement in which all pixels have a structure in which a Y dot overlaps a K dot. FIG. 2D shows a dot arrangement in which K and Y dots are alternately arranged, half the pixels have the single K dot structure, and the remaining half pixels have the single Y dot structure. FIG. 2E shows a dot arrangement in which no dot is arranged in all pixels, that is, a dot arrangement having the background structure. FIG. 2F shows a sequential dot arrangement in which K dots, background, and Y dots are sequentially arranged, ⅓ pixels have the single Y dot structure, ⅓ pixels have the single K dot structure, and the remaining ⅓ pixels have the background structure.

Figure 3:
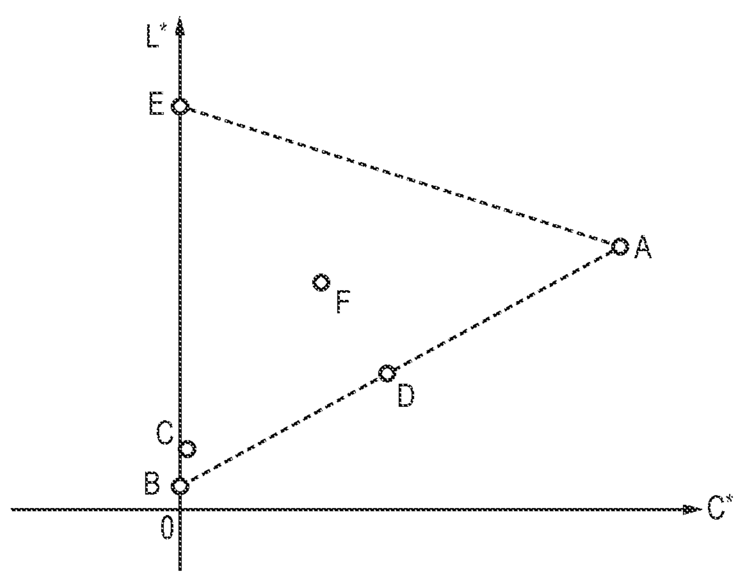
FIG. 3 is a graph showing the relationship between the arrangement of a color dot and the color point.

FIG. 3 is a graph showing the color relationship for materials recorded by the respective dot arrangements shown in FIGS. 2A to 2F. The ordinate represents L* in the CIELAB space, and the abscissa represents C* ($=\sqrt{(a^{*2}+b^{*2})}$). In FIG. 3, a point A is a point representing a color corresponding to the dot arrangement of FIG. 2A. Similarly, points B, C, D, E, and F are points representing colors corresponding to the dot arrangements of FIGS. 2B to 2F, respectively.

In the following description, the color of a material recorded by a given dot arrangement will be called the "color of the dot arrangement". The color of a dot arrangement in which all pixels have a single dot structure will be called the "color of the structure". A point in the color space that corresponds to the color of the dot arrangement will be called the "color point of the dot arrangement". A point in the color space that corresponds to the color of the structure will be called the "color point of the structure". A color corresponding to a given point in the color space will be called the "color of the point". A point in the color space that corresponds to a given color will be called the "point of the color". A dot arrangement for recording a given color will be called the "dot arrangement of the color".

The color point of each dot structure and the color point of a dot arrangement obtained by combining a plurality of structures substantially have the following relationship. This relationship will be explained with reference to FIG. 3. When the color point of the single K dot structure and that of the single Y dot structure are defined as a point B and point A, the color point of a dot arrangement serving as a combination of these structures moves on a line segment AB in accordance with the ratio of the numbers of pixels in these two structures. Similarly, when the color point of the background structure is defined as a point E, the color point of a dot arrangement serving as a combination of the single K dot structure, single Y dot structure, and background structure moves inside (including sides) a triangle ABE in accordance with the ratio of the numbers of pixels in these three structures. In other words, the internal color of the triangle ABE can be recorded by appropriately setting the ratio of the numbers of pixels in these three types of structures, that is, the single K dot structure, single Y dot structure, and background structure.

Generally, when a triangle having, as vertices, the color points of three different types of structures is considered, the internal color of the triangle can be recorded by appropriately setting the ratio of the numbers of pixels in these three types of structures. Similarly, when a tetrahedron having, as vertices, the color points of four different types of structures in a three-dimensional color space is considered, the color inside (including planes) the tetrahedron can be recorded by appropriately setting the ratio of the numbers of pixels in these four types of structures.

Next, the relationship between the dot arrangement and the color gamut will be explained. As described above, the color of a point inside a tetrahedron having, as vertices, the color points of four different types of structures can be reproduced by combining the four types of structures. This tetrahedron serves as a maximum color gamut recordable by dot arrangements using the four types of structures. When n ($4<n$) types of structures are usable, four types of structures are selected from them, and the color of a point inside a tetrahedron having the color points of the selected structures as vertices can be recorded by a combination of the selected structures.

First, tetrahedrons each having the color points of four selected types of structures as vertices are obtained for all combinations each of four types of structures selected from n types of structures. Then, a polyhedron containing all the tetrahedrons is obtained. This polyhedron represents a maximum color gamut recordable by dot arrangements using the n types of structures. The polyhedron forms a minimum convex figure containing the color points of all the structures. The minimum convex figure containing points is generally called the convex hull of these points. That is, a maximum color gamut recordable by the n types of structures is a polyhedron (including planes) serving as the convex hull of n color points indicated by the colors of these structures in a three-dimensional color space. In the following description, this polyhedron will be called a "gamut polyhedron".

Next, the dot arrangement of a color at the boundary of the gamut polyhedron will be explained. The boundary of the gamut polyhedron is the surface of the gamut polyhedron. In the following description, a color positioned on the surface of the gamut polyhedron will be called the "color of the gamut boundary". A color other than the color of the gamut boundary, that is, a color positioned inside (including no plane) the gamut polyhedron will be called the "internal color of the gamut". The surface of the gamut polyhedron is formed from a polygon having the color points of usable structures as vertices. The usable structure is a structure recordable on a recording medium. This polygon will be called the “surface polygon of the gamut”.

In many cases, the surface polygon of the gamut is a triangle. Structures whose color points are positioned inside (including sides) the triangle are often only three types of structures whose color points are positioned at the vertices of the triangle. When the color points of four or more types of structures exist on the same plane, the surface polygon of the gamut may be an n-gon (3<n), or the color points of overlapping structures may be positioned at points inside the surface polygon of the gamut, other than the vertices.

However, a dot arrangement formed from only structures whose color points are positioned inside the surface polygon of the gamut always records the color of a point inside the surface polygon of the gamut, and does not record the color of a point outside (including no side) the surface polygon of the gamut. In other words, the color of a point inside the surface polygon of the gamut is recorded by a dot arrangement formed from structures whose color points are positioned inside the surface polygon of the gamut, and such a dot arrangement does not include another structure.

Figure 4:
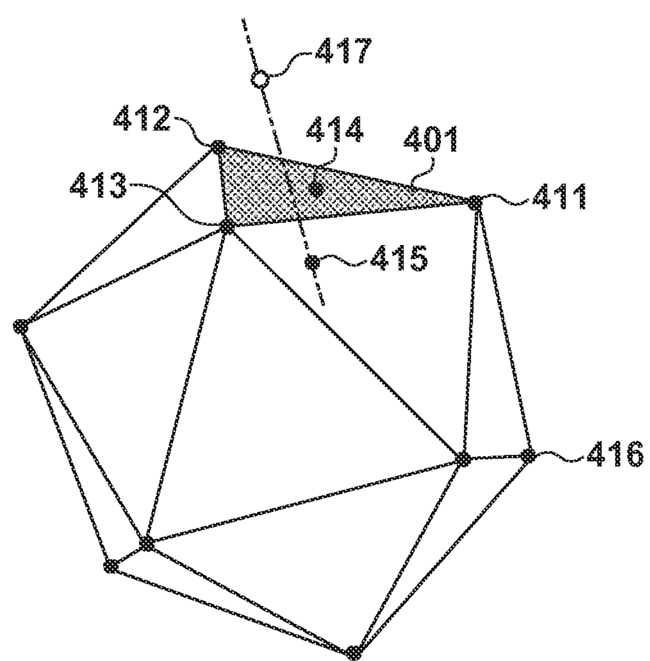
FIG. 4 is a view exemplifying a gamut polyhedron.

This relationship will be explained with reference to FIG. 4. FIG. 4 is a view exemplifying a gamut polyhedron, and exemplifies a gamut polyhedron in a three-dimensional color space. A polygon 401 is a surface polygon of the gamut. Vertices indicated by filled circles indicate the color points of structures. More specifically, points 411 to 416 are the color points of structures. The points 411 to 413 are the vertices of the surface polygon 401 of the gamut, the point 414 is a point inside the surface polygon 401 of the gamut, and the point 415 is a point inside the gamut polyhedron. The point 416 is a point outside the surface polygon 401 of the gamut, and a point on the surface of the gamut polyhedron. Assume that structures whose color points are positioned inside the surface polygon 401 of the gamut are only four types of structures having the points 411 to 414 as color points. In the following description, when a point X is the color point of a structure, a structure whose color point is positioned at the point X will be called a “structure X”.

The color of a point inside the surface polygon 401 of the gamut is recorded by a dot arrangement formed from four types of structures 411 to 414 whose color points are positioned inside the surface polygon 401 of the gamut. Some internal colors of the surface polygon 401 of the gamut are recorded by dot arrangements formed from one to three types of structures out of these four types. However, structures other than these four types are not used in dot arrangements which record any color.

More specifically, a dot arrangement which records the color of a point inside the surface polygon 401 of the gamut includes neither the structure 415 nor structure 416 whose color point is positioned outside the surface polygon 401 of the gamut. If the color of a point 417 can be recorded in FIG. 4, a new dot arrangement obtained by combining the structures 417 and 415 can record the color of an intersection between a line segment connecting the points 415 and 417, and the surface polygon 401 of the gamut. In other words, if the color of a color point positioned opposite the point 415 via a plane including the surface polygon 401 of the gamut can be recorded, the internal color of the surface polygon 401 of the gamut can be recorded by a dot arrangement including the structure 415.

However, the surface polygon 401 of the gamut is the surface of the gamut polyhedron, and all recordable colors are positioned on only one plane (including the plane) including the surface polygon 401 of the gamut. That is, a dot arrangement which records the color of a point inside the surface polygon 401 of the gamut includes neither the structure 415 nor structure 416 whose color point is positioned outside the surface polygon 401 of the gamut. In other words, a dot arrangement which records the color of a point inside the surface polygon 401 of the gamut is formed from only structures whose color points are positioned inside the surface polygon 401 of the gamut.

When recording the color of the gamut boundary, a conventional color printer records even by a dot arrangement including the structures 415 and 416. More specifically, the dot arrangement used to record the color of the gamut boundary includes a structure positioned inside (including no plane) the gamut polyhedron, and a plurality of structures which are positioned on the surface of the gamut polyhedron but are not positioned inside (including sides) the same surface polygon of the gamut. As a result, the color of the gamut boundary is recorded by the internal color of the gamut, and a color of the gamut boundary which maximizes the color gamut cannot be recorded.

To solve this, the present invention controls to set an appropriate dot arrangement for the color of the gamut boundary. For example, when an input color signal is a color signal representing the color of the gamut boundary, it is controlled to record the color of the gamut boundary by a dot arrangement which implements it. Note that the color of the gamut boundary is a color recordable by a printer, and represents a color having a highest saturation at each lightness in each hue.

The above-described dot arrangement of the color of the gamut boundary is summarized as follows. First, a set of structures positioned inside (including sides) each surface polygon of the gamut is defined as a “surface structure set”. A set of surface structure sets corresponding to all surface polygons of the gamut in the gamut polyhedron is defined as a “gamut structure set”.

Figure 5:
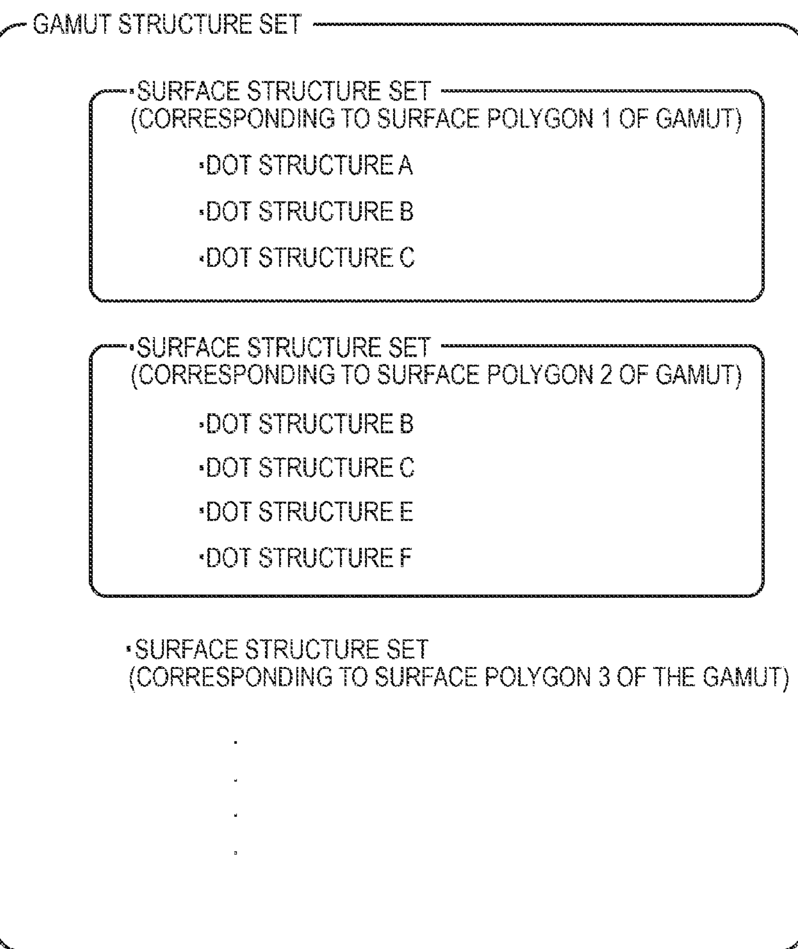
FIG. 5 is a view showing the relationship between a gamut structure set and a surface structure set.

FIG. 5 shows the relationship between the gamut structure set and the surface structure set. As shown in FIG. 5, the surface structure set is a set of dot structures, and the gamut structure set is a set of surface structure sets. One surface polygon of the gamut corresponds to one surface structure set. The surface structure set is formed from dot structures whose color points are positioned inside the surface polygon of the gamut. The gamut structure set is formed from surface structure sets regarding all the surface polygons of the gamut in the gamut polyhedron.

A combination of structures forming the dot arrangement of the color of the gamut boundary is formed from a subset of a surface structure set in the gamut structure set. In contrast, the color of a dot arrangement serving as a combination of structures formed from a subset of a surface structure set in the gamut structure set is the color of the gamut boundary. When a combination of structures forming a given dot arrangement is not a subset of a surface structure set in the gamut structure set, the color of the dot arrangement is the internal color of the gamut. Structures forming the dot arrangement of the color of the gamut boundary do not include structures whose color points are positioned inside (including no plane) the gamut polyhedron. The color of a dot arrangement including a structure whose color point is positioned inside the gamut polyhedron is the internal color of the gamut.

In an image recording system according to the first embodiment, dot arrangement data is generated so that the dot arrangement of a color at the gamut boundary serves as the dot arrangement of the color of the gamut boundary.

Schematic Arrangement of Image Recording System

Figure 6:
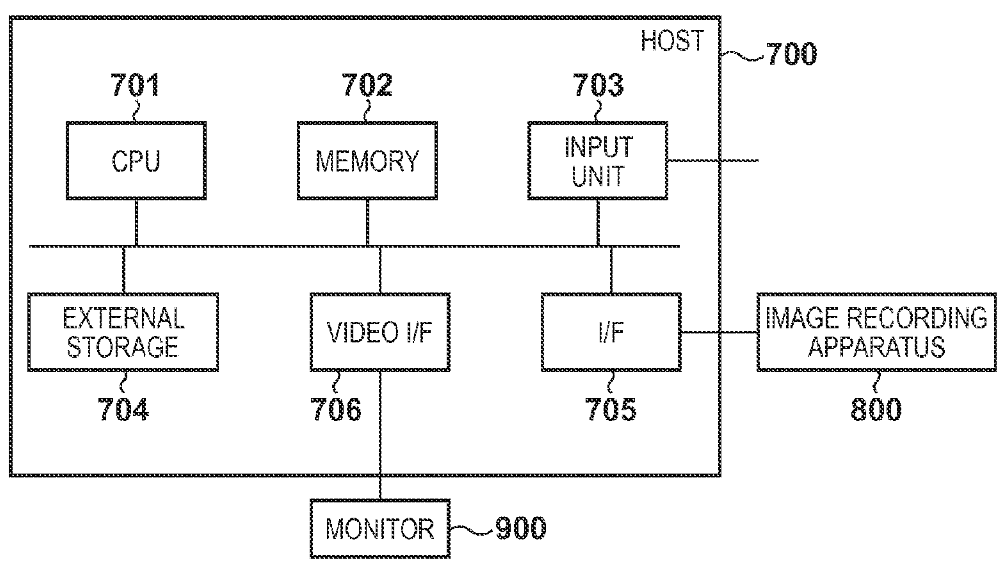
FIG. 6 is a block diagram showing the arrangement of an image recording system.

FIG. 6 is a block diagram showing the schematic arrangement of the image recording system. In FIG. 6, a host 700 serving as an information processing apparatus is, for example, a computer, and includes a microprocessor (CPU) 701, a memory 702 such as a random access memory, an input unit 703 such as a keyboard, and an external storage 704 such as a hard disk drive. The host 700 further includes a communication interface (to be referred to as a "printer I/F" hereinafter) 705 between the host 700 and an image recording apparatus 800, and a communication interface (to be referred to as a "video I/F" hereinafter) 706 between the host 700 and a monitor 900.

The CPU 701 executes various processes according to programs stored in the memory 702. In particular, the CPU 701 executes image processes such as resolution conversion, color matching, pixel color conversion, halftone processing, and pass separation according to the first embodiment. These programs are stored in the external storage 704 or supplied from an external apparatus (not shown). The host 700 outputs various kinds of information to the monitor 900 via the video I/F 706, and receives various kinds of information via the input unit 703. The host 700 is connected to the image recording apparatus 800 via the printer I/F 705, transmits generated dot arrangement data to the image recording apparatus 800 to perform recording, and receives various kinds of information from the image recording apparatus 800.

Schematic Arrangement of Image Recording Apparatus

Figure 7:
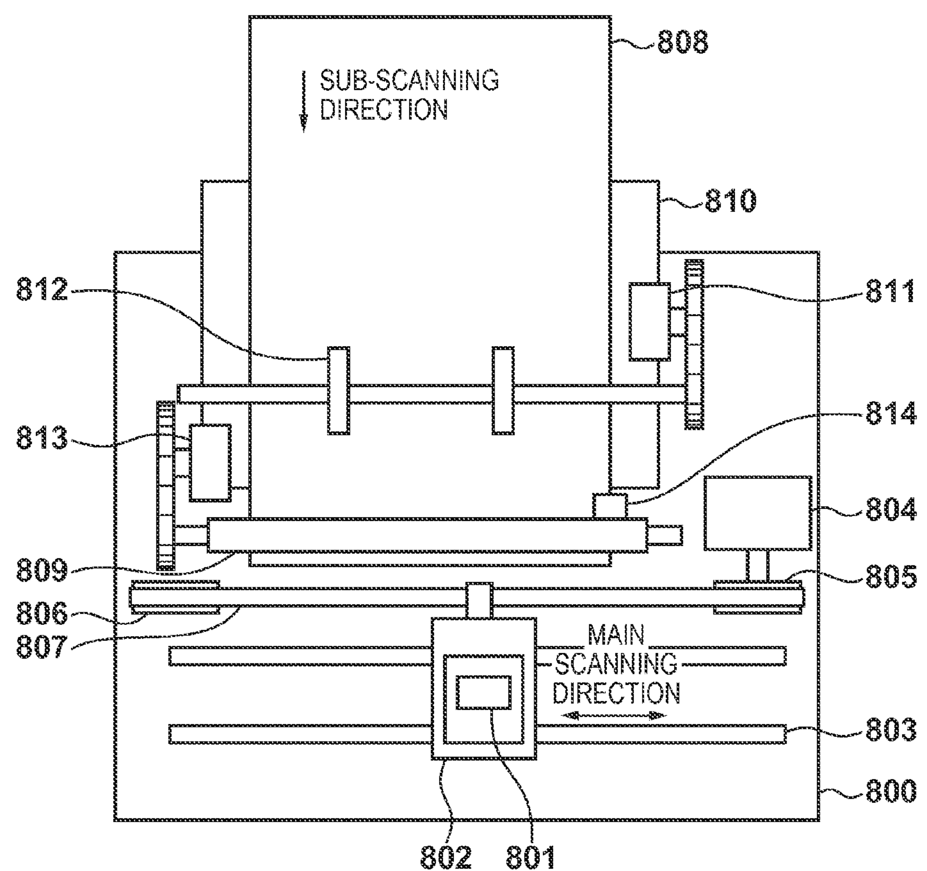
FIG. 7 is a view showing the arrangement of an image recording apparatus.

FIG. 7 is a view showing the schematic arrangement of the image recording apparatus 800. The image recording apparatus 800 is assumed to be an inkjet printer which records an image by using ink. A head cartridge 801 includes a printhead including a plurality of orifices, an ink tank for supplying ink to the printhead, and a connector for receiving a signal for driving each orifice of the printhead and the like. The head cartridge 801 is positioned and interchangeably mounted on a carriage 802. The carriage 802 includes a connector holder for transmitting a driving signal and the like to the head cartridge 801 via the connector.

The carriage 802 can reciprocate along a guide shaft 803. More specifically, the carriage 802 is driven via a driving mechanism including a motor pulley 805, driven pulley 806, and timing belt 807 by using a main scanning motor 804 as a driving source, and its position and movement are controlled. Note that the movement of the carriage 802 along the guide shaft 803 is called "main scanning", and the moving direction is called a "main scanning direction".

Recording media 808 such as printing paper are set on an auto sheet feeder (to be referred to as an "ASF" hereinafter) 810. In image recording, a sheet feed motor 811 drives pickup rollers 812 to rotate via a gear, and the recording media 808 are separated and fed one by one from the ASF 810. By rotation of a conveyance roller 809, the recording medium 808 is further conveyed to a recording start position facing the orifice surface of the head cartridge 801 on the carriage 802. The conveyance roller 809 is driven via a gear by using a line feed (LF) motor 813 as a driving source. Determination of whether the recording medium 808 has been fed, and settlement of the sheet feed position are performed after the recording medium 808 passes through a paper end sensor 814. The head cartridge 801 mounted on the carriage 802 is held so that its orifice surface extends downward from the carriage 802 and becomes parallel to the recording medium 808.

Image Recording Operation

An image recording operation in the inkjet printer having the arrangement shown in FIG. 7 will be explained. When the recording medium 808 is conveyed to a predetermined recording start position, the carriage 802 moves above the recording medium 808 along the guide shaft 803. During the movement, ink is discharged from the orifices of the printhead. After the carriage 802 moves to one end of the guide shaft 803, the conveyance roller 809 conveys the recording medium 808 by a predetermined amount in a direction perpendicular to the scanning direction of the carriage 802. The conveyance of the recording medium 808 is called "paper feed" or "sub-scanning", and the conveyance direction is called a "paper feed direction" or "sub-scanning direction". After the end of conveying the recording medium 808 by the predetermined amount, the carriage 802 moves again along the guide shaft 803. By repeating the scanning of the printhead by the carriage 802 and the paper feed, an image is formed on the entire recording medium 808.

Figures 8A, 8B, 8C:
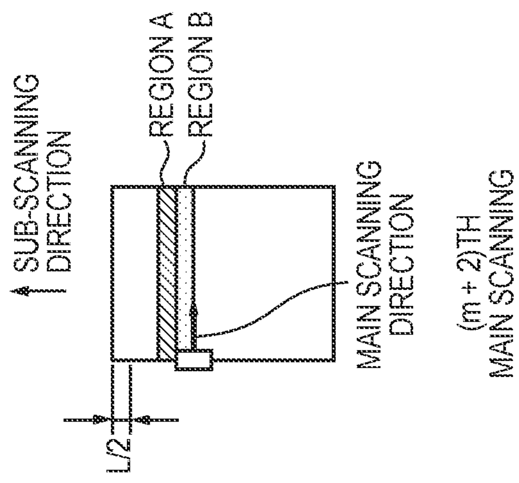
FIGS. 8A to 8C are views for explaining a multipass recording operation.

FIGS. 8A to 8C are views for explaining a 2-pass recording operation of recording an image by scanning the printhead twice above the same line of the recording medium 808. In 2-pass recording, as shown in FIGS. 8A to 8C, image recording is performed by the width L of the printhead in main scanning by the carriage 802. Every time recording of one line ends, the recording medium 808 is conveyed by a distance L/2 in the sub-scanning direction. For example, a region A is recorded by the mth main scanning (FIG. 8A) and (m+1)th main scanning (FIG. 8B) of the printhead. A region B is recorded by the (m+1)th main scanning (FIG. 8B) and (m+2)th main scanning (FIG. 8C) of the printhead. Similarly, when n-pass recording is performed, the recording medium 808 is conveyed by a distance L/n in the sub-scanning direction every time recording of one line ends. In this case, an image is formed by scanning the printhead n times above the same line of the recording medium.

In general, as the value of the pass count n is larger, the influence of variations of the ink discharge amount and discharge direction is suppressed much more to make density unevenness less conspicuous, but the time taken for recording becomes longer. Since the inkjet printer according to the embodiment forms a predetermined dot structure by a plurality of passes, which will be described later, the pass count n needs to be two or more. For example, 4-pass recording is performed.

Printhead

The structure of the printhead will be explained. FIGS. 9A and 9B are views showing the structure of the head cartridge 801. As shown in FIG. 9A, the head cartridge 801 includes ink tanks 1301 which store inks as color materials, and a printhead 1302 which discharges inks supplied from the ink tanks 1301 in accordance with discharge signals. The head cartridge 801 includes, for example, the independent ink tanks 1301 of yellow (Y), magenta (M), cyan (C), and black (K), which are freely detachable from the printhead 1302, as shown in FIG. 9B.

Figure 10:
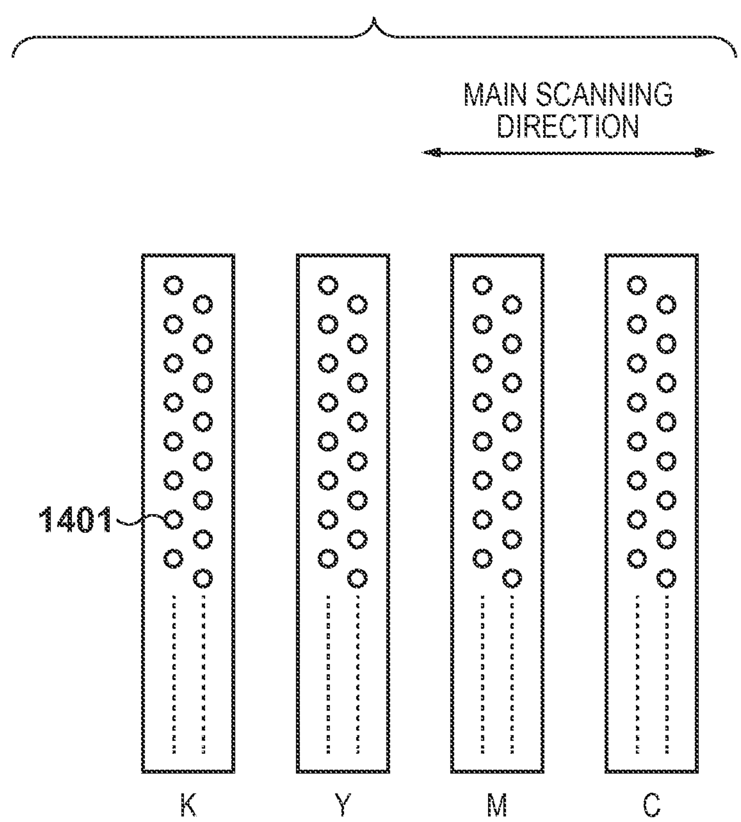
FIG. 10 is a view showing the orifice surface of the printhead.

Ink orifices are positioned at the lower portion of the printhead 1302. FIG. 10 is a view exemplifying the orifice surface of the printhead 1302. In the example shown in FIG. 10, a total of four printheads are juxtaposed in the main scanning direction for the respective, K, Y, M, and C ink colors. Each printhead has 128 orifices 1401 per array, and two orifice arrays shifted in the sub-scanning direction are arranged in the main scanning direction.

Image Processing

Image processing in the image recording system according to the embodiment will be explained.

Figure 11:
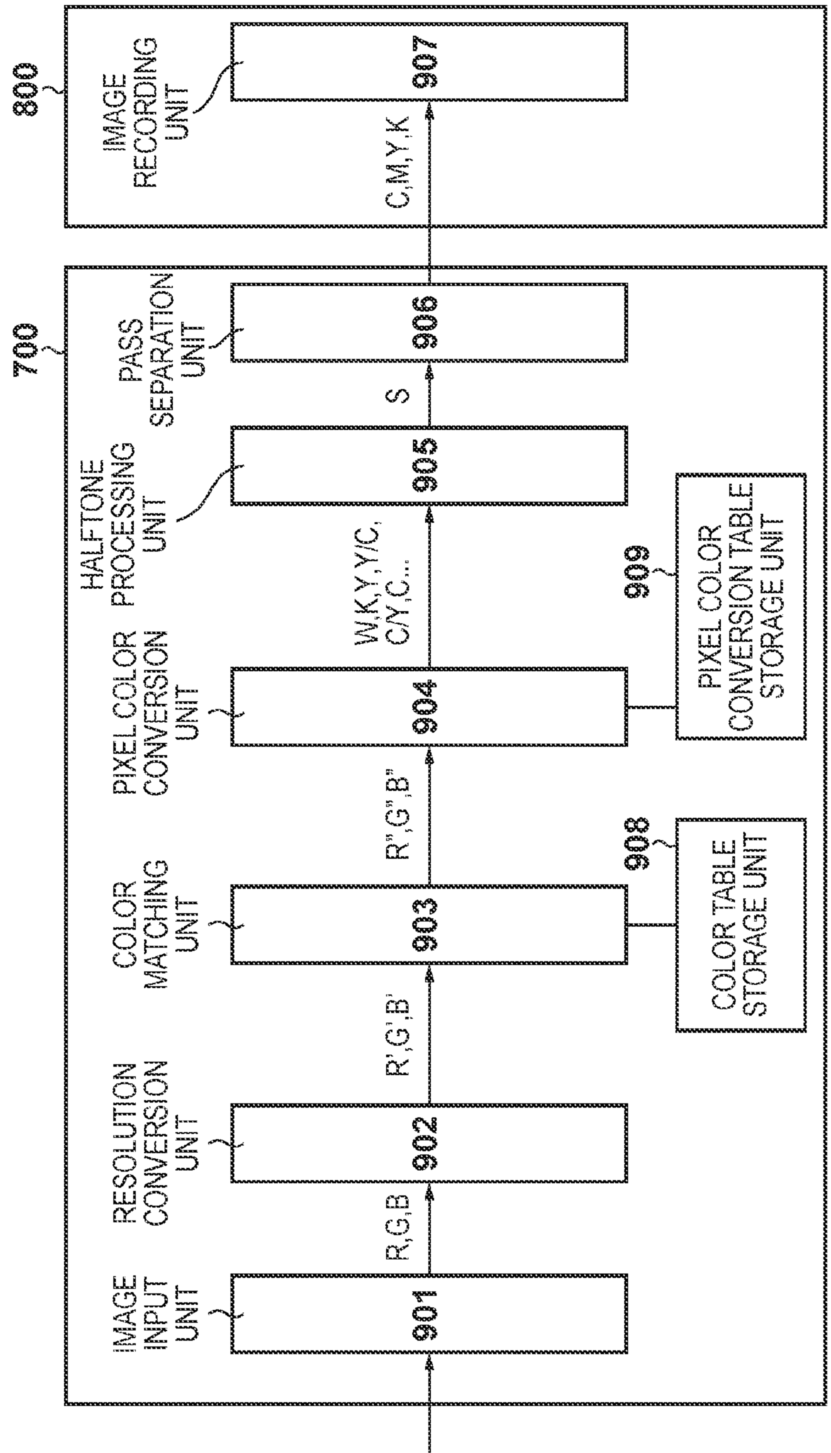
FIG. 11 is a block diagram showing the functional arrangement of the image recording system.

FIG. 11 is a block diagram showing an arrangement in the image recording system according to the first embodiment. In FIG. 11, the host 700 implements an image input unit 901, resolution conversion unit 902, color matching unit 903, pixel color conversion unit 904, halftone processing unit 905, and pass separation unit 906. The image recording apparatus 800 implements an image recording unit 907.

The image input unit 901 receives image data, and outputs a color signal (R, G, B) forming the image data. The input image data may be a CMYK image, and in this case, a color signal (C, M, Y, K) is output.

The resolution conversion unit 902 receives the color signal (R, G, B) from the image input unit 901, converts the resolution of the input image into the printing resolution of the image recording apparatus 800, and outputs the converted color signal (R', G', B'). The printing resolution is, for example, a resolution at which the size of one pixel becomes 0.8 times of the diameter of a dot recorded on a recording medium. As the resolution conversion method, for example, a known bicubic method is usable. The resolution conversion processing is performed for each channel, and an R channel signal of the input color signal (R, G, B) is converted into an R' channel signal of the output color signal (R', G', B').

The color matching unit 903 functions as a gamut mapping unit which receives the color signal (R', G', B'), converts it into a color signal (R", G", B") dependent on the image recording apparatus 800, and outputs the color signal (R", G", B"). It suffices to perform mapping from the color signal (R', G', B') into the color signal (R", G", B") by using a known three-dimensional lookup table method (to be referred to as a "3DLUT method" hereinafter) of looking up a color table stored in a color table storage unit 908. At this time, the color table holds the color signal (R", G", B") corresponding to the discrete input color signal (R', G', B').

Alternatively, a plurality of color tables may be prepared in accordance with the intent of color reproduction and the type of recording medium, switched in accordance with a set condition, and used for gamut mapping. The intent of color reproduction is, for example, each condition such as "match with a color displayed on the monitor", "match with a color printed by a standard printer", or "preferable reproduction of a memory color (for example, skin color, sky blue, or grass green)". Typically, when a color table corresponding to the intent of color reproduction "no color correction" or "vivid color reproduction" is selected, a color table which converts a color signal forming an input image into a color signal dependent on the image recording apparatus 800 can be selected.

If the input color signal is a CMYK signal, the color matching unit 903 receives a resolution-converted color signal (C', M', Y', K'), converts it into a color signal (R", G", B") dependent on the image recording apparatus 800, and outputs the color signal (R", G", B"). In this case, the color table holds the color signal (R", G", B") corresponding to the discrete input color signal (C', M', Y', K').

The pixel color conversion unit 904 receives the color signal (R", G", B"), converts it into a pixel color signal (W, K, Y, M, C, Y/C, C/Y, C/M, M/C, M/Y, Y/M), and outputs the pixel color signal. The conversion into a pixel color signal is performed according to a known 3DLUT method of looking up a pixel color conversion table stored in a pixel color conversion table storage unit 909. The pixel color signal is a color signal containing, as a component, a multi-level color signal regarding each of dot structures recordable in each pixel on a recording medium.

The dot structures are, for example, the following 11 structures. First, these dot structures include a total of five structures: a background structure in which no dot is arranged, a structure in which only a dot of K ink is arranged, and similarly, structures in which Y, M, and C dots are singly arranged, respectively.

Further, these dot structures include a total of six structures: a structure in which a Y dot is arranged on a C dot to overlap each other, a structure in which a C dot is arranged on a Y dot, a structure in which a C dot is arranged on an M dot, a structure in which an M dot is arranged on a C dot, a structure in which an M dot is arranged on a Y dot, and a structure in which a Y dot is arranged on an M dot.

Each pixel on a recording medium is recorded with one of these dot structures including the background structure. The multi-level color signal (W, K, Y, M, C, Y/C, C/Y, C/M, M/C, M/Y, Y/M) regarding each of the dot structures indicates the ratio of the numbers of pixels in respective structures to be arranged. For example, if the pixel color signal is (W, K, Y, M, C, Y/C, C/Y, C/M, M/C, M/Y, Y/M)=(0, 0, 1, 0, 0, 0, 0, 0, 0, 0, 0), the single Y dot structure is arranged in all pixels (ratio of 1) for which this pixel color signal is set. If the pixel color signal is (0, 0, 0.5, 0, 0, 0.5, 0, 0, 0, 0, 0), the single Y dot structure is arranged in half pixels (ratio of 0.5) for which this pixel color signal is set, and the structure in which a Y dot overlaps a C dot is arranged in the remaining half pixels. Note that W is the component of the background structure. Since the sum of the components of the pixel color signal is always 1, the pixel color signal acts as arrangement ratio data representing the arrangement ratio of a plurality of types of dot structures. Note that a structure whose component is 0 is not arranged.

The following pixel color signal will be examined. The pixel color signal is a subset of a surface structure set (a set of dot structures positioned inside the surface polygon of the gamut), and the sum of components corresponding to the respective structures is 1. A pixel for which the pixel color signal is set is arranged with a combination of structures in the subset of the surface structure set, and no other structure is arranged. As described above, a color recorded by this dot arrangement is the color of the gamut boundary.

The pixel color conversion unit 904 in the first embodiment converts the color signal (R", G", B") representing the color of the gamut boundary into a pixel color signal corresponding to the color of the gamut boundary by using the pixel color conversion table stored in the pixel color conversion table storage unit 909, details of which will be described later.

The halftone processing unit 905 determines a dot structure to be recorded in each pixel on a recording medium according to an error diffusion method, and outputs a color signal S corresponding to the dot structure. The color signal S has a number corresponding to a dot structure. For example, 0 represents the background structure, 1 represents a structure in which only a K dot is arranged, and 2 is a structure in which only a Y dot is arranged. That is, an output from the halftone processing unit 905 is dot arrangement data.

A dot structure to be arranged in each pixel is determined as follows. The sum of error signals from neighboring pixels is added to the pixel color signal of a pixel of interest, and then a dot structure corresponding to one component having a largest value is set as the dot structure of the pixel of interest. For example, when the pixel color signal of the pixel of interest is (0, 0, 0.5, 0, 0, 0.5, 0, 0, 0, 0, 0), and the sum of error signals diffused from neighboring pixels is (0, 0, 1, 0, 0, 0, 0, 0, 0, 0, 0), the following processing is performed. First, a determination signal as the sum of these two signals is (W, K, Y, M, C, Y/C, C/Y, C/M, M/C, M/Y, Y/M)=(0, 0, 1.5, 0, 0, 0.5, 0, 0, 0, 0, 0). In this case, a structure in which only a Y dot corresponding to a component having a largest value is arranged is determined as the dot structure of the pixel of interest. Then, a color signal corresponding to the dot structure is output (for example, S=2 is output).

The error signal has a value obtained by subtracting, from the determination signal, a pixel color signal corresponding to the determined dot structure. In the above example, the pixel color signal corresponding to the determined dot structure is (0, 0, 1, 0, 0, 0, 0, 0, 0, 0, 0). In this case, the error signal is (0, 0, 0.5, 0, 0, 0.5, 0, 0, 0, 0, 0).

Figure 12:
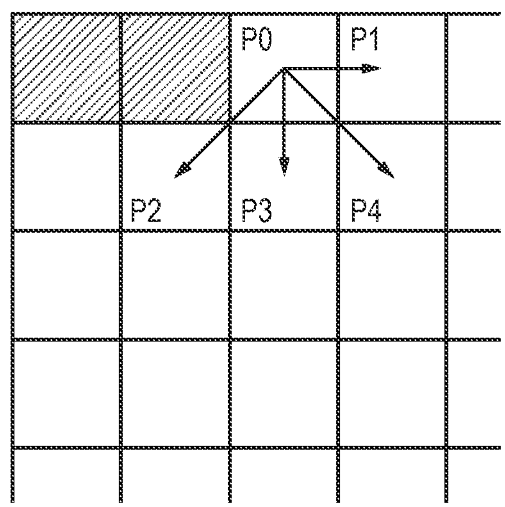
FIG. 12 is a view for explaining diffusion of an error signal to neighboring pixels.

FIG. 12 is a view for explaining diffusion of an error signal to neighboring pixels. In FIG. 12, P0 is a pixel of interest, and hatched pixels are pixels for which dot structures have already been determined. The error of the pixel P0 of interest is diffused at predetermined ratios to neighboring pixels P1, P2, P3, and P4 around P0 for which no dot structure has been determined yet. For example, 7/16, 3/16, 5/16, and 1/16 of the error of P0 are diffused to the pixels P1, P2, P3, and P4.

The pass separation unit 906 generates a binary image of each dot structure from the output signal S of the halftone processing unit 905. Further, the pass separation unit 906 applies a pass mask to the binary image, generating and outputting a binary image signal corresponding to a discharge signal for each ink and each pass. That is, an output from the pass separation unit 906 is also dot arrangement data. The binary image signal of each dot structure represents an image in which 1 is set in pixels having the dot structure set by the halftone processing unit 905, and 0 is set in the remaining pixels.

FIGS. 13A to 13E are views for explaining a binary image generation method. FIG. 13A exemplifies an image of 4×4 pixels based on the dot structures of the respective pixels set by the halftone processing unit 905. In this example, a binary image having the background structure W in which a dot of any ink is not arranged is generated as shown in FIG. 13B. Similarly, a binary image having the structure Y in which only a Y dot is arranged is generated as shown in FIG. 13C. A binary image having the structure Y/C in which a Y dot is arranged on a C dot to overlap each other is generated as shown in FIG. 13D. Binary images having the remaining structures are generated as shown in FIG. 13E.

FIGS. 14A and 14B are views exemplifying pass mask settings. FIG. 14A shows the type of dot structure, the type of color material, and a pass mask number corresponding to a pass number. FIG. 14B exemplifies a pass mask corresponding to each pass mask number. In FIGS. 14A and 14B, a binary image corresponding to a C ink discharge signal for the first pass is generated by the logical sum of the results of the next mask processes, that is, the result of applying a mask M2-1 to a binary image of the structure Y/C, the result of applying a mask M4-1 to a binary image of the structure C, and the result of applying the mask M2-1 to a binary image of the structure M/C.

FIGS. 15A to 15H are views exemplifying pass separation results, and show binary images of respective passes for Y and C inks obtained by processing an image of the dot structures in FIG. 13A by using the pass masks in FIGS. 14A and 14B. More specifically, 1 is set in pixels in which ink is arranged, that is, discharged, and 0 is set in pixels in which ink is not arranged, that is, not discharged. FIGS. 15A to 15D show discharge signals of the first to fourth passes for Y ink. FIGS. 15E to 15H show discharge signals of the first to fourth passes for C ink.

Referring back to FIG. 11, the image recording unit 907 records an image on a recording medium by discharging each ink based on the output signal from the pass separation unit 906.

In the image recording system according to the first embodiment, the respective units including the image input unit 901 up to the halftone processing unit 905 generate dot arrangement data regarding the dot structure of each pixel from an input image. Further, the pass separation unit 906 generates dot arrangement data for each color material and each pass. The image recording unit 907 records a color material on a recording medium based on the generated dot arrangement data.

Image Recording Procedure

Figure 16:
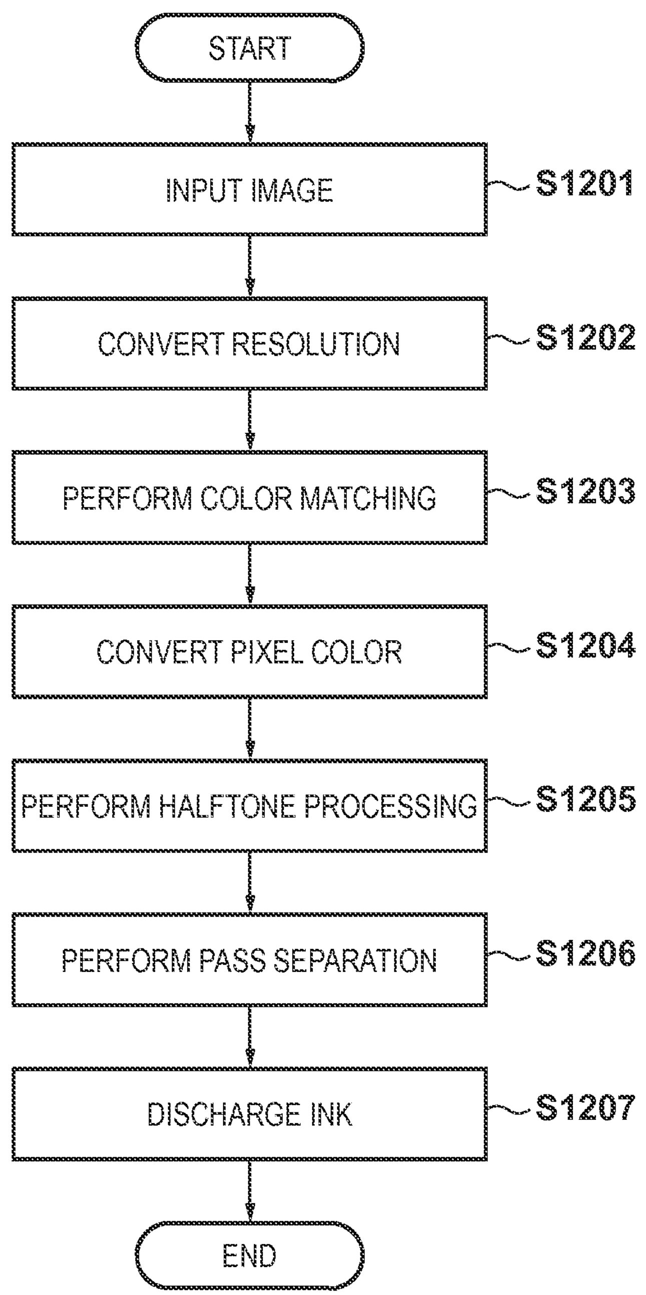
FIG. 16 is a flowchart showing an image recording procedure.

An image recording procedure in the image recording system according to the first embodiment will be explained with reference to the flowchart of FIG. 16.

First, image data to be recorded is input (S1201). Then, resolution conversion is performed (S1202). The resolution conversion unit 902 executes the resolution conversion to convert the resolution of the image input in step S1201 into the printing resolution of the image recording apparatus 800.

Color matching is performed (S1203). The color matching unit 903 executes the color matching to calculate a color signal dependent on the image recording apparatus 800 in order to record an image of color reproduction suited to a set condition.

After that, pixel color conversion is performed (S1204). The pixel color conversion unit 904 executes the pixel color conversion to calculate a pixel color signal regarding the ratio of the numbers of pixels to be recorded with respective ink overlapping structures. The ink overlapping structure is an overlapping structure recordable in each pixel on a recording medium.

Halftone processing is performed (S1205). The halftone processing unit 905 executes the halftone processing to set the type of ink overlapping structure to be recorded in each pixel on a recording medium.

Pass separation is performed (S1206). The pass separation unit 906 executes the pass separation to generate a dot arrangement signal for each ink and each pass.

Finally, the image recording unit 907 discharges each ink based on the dot arrangement signal generated in step S1206, recording an image on the recording medium (S1207).

Pixel Color Conversion Table

The pixel color conversion table to be looked up by the pixel color conversion unit 904 will be explained in detail with reference to FIG. 17. FIG. 17 is a table exemplifying the pixel color conversion table.

As shown in FIG. 17, the pixel color conversion table describes the correspondence between the discrete color signal (R", G", B") and the pixel color signal (W, K, Y, M, C, Y/C, C/Y, C/M, M/C, M/Y, Y/M). As the discrete color signal (R", G", B") forming the pixel color conversion table, a value corresponding to a grid point in the RGB space that is obtained by incising each of R", G", and B" at a predetermined step width is set. In the first embodiment, a pixel color signal corresponding to the dot arrangement of the color of the gamut boundary is associated particularly with a color signal (R", G", B") representing the color of the gamut boundary in the pixel color conversion table, thereby implementing a wide color gamut.

Figure 18:
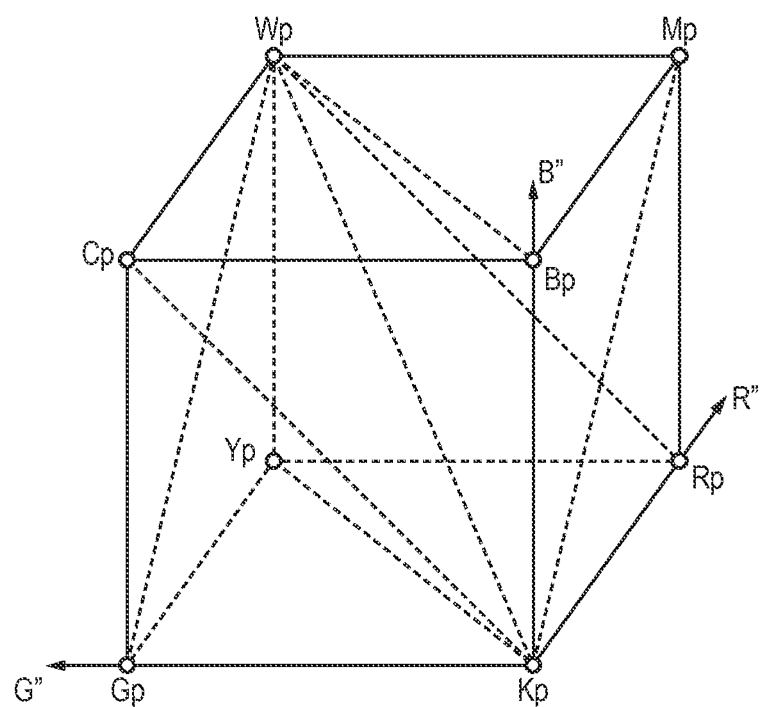
FIG. 18 is a view showing an RGB color space.

The color signal (R", G", B") of the gamut boundary will be explained. FIG. 18 is a view showing the RGB color space (R", G", B") of an input color signal. If the signal is formed from 8 bits, points Wp, Cp, Mp, Yp, Rp, Gp, Bp, and Kp in the color space shown in FIG. 18 are defined by the following signal values:

$$Wp=(R'',G'',B'')=(255,255,255) \quad (1)$$

$$Cp=(R'',G'',B'')=(0,255,255) \quad (2)$$

$$Mp=(R'',G'',B'')=(255,0,255) \quad (3)$$

$$Yp=(R'',G'',B'')=(255,255,0) \quad (4)$$

$$Rp=(R'',G'',B'')=(255,0,0) \quad (5)$$

$$Gp=(R'',G'',B'')=(0,255,0) \quad (6)$$

$$Bp=(R'',G'',B'')=(0,0,255) \quad (7)$$

$$Kp=(R'',G'',B'')=(0,0,0) \quad (8)$$

The color signal (R", G", B") of the gamut boundary is a color signal positioned on the surface of a cube shown in FIG. 18, that is, a color signal at a point inside (including sides) tetragons WpCpBpMp, WpYpRpMp, WpYpGpCp, KpRpYpGp, KpBpMpRp, and KpBpCpGp.

A pixel color signal (W, K, Y, M, C, Y/C, C/Y, C/M, M/C, M/Y, Y/M) corresponding to the color signal (R", G", B") of the gamut boundary in the pixel color conversion table represents the dot arrangement of the color of the gamut boundary, as described above. The pixel color signal is determined by, for example, the following method.

First, a pixel color signal (W, K, Y, M, C, Y/C, C/Y, C/M, M/C, M/Y, Y/M) empirically predicted to correspond to a given color signal (R", G", B") is prepared. For example, information of a surface structure set considered to correspond to the color signal (R", G", B") in a gamut structure set which is set as will be described later may be used. The image recording apparatus 800 records a patch image of a size capable of color measurement at the arrangement ratio of dot structures represented by the prepared pixel color signal. The patch is then measured to acquire, for example, a color point for each image color signal. The color point suffices to correspond to the color signal (R", G", B") to be processed. This measurement is performed for a plurality of pixel color signals which are prepared on the assumption that they correspond to the color signal (R", G", B"). A pixel color signal determined to best reproduce the color signal (R", G", B") is set in the pixel color conversion table.

The pixel color signal setting method is not limited to the color of the gamut boundary, and is similarly applicable to the color signal (R", G", B") of the internal color of the gamut in the pixel color conversion table. The method of setting a pixel color signal corresponding to the color signal (R", G", B") is not limited to this example. Another method is available as long as a pixel color signal representing the dot arrangement of the color of the gamut boundary can be finally associated with the color signal of the color of the gamut boundary.

Verification of Pixel Color Signal Corresponding to Color of Gamut Boundary

As described above, the pixel color conversion table in the first embodiment needs to associate, with the color signal (R", B", G") of the color of the gamut boundary, a pixel color signal (W, K, Y, M, C, Y/C, C/Y, C/M, M/C, M/Y, Y/M) representing the dot arrangement of the color of the gamut boundary. This verification procedure will be explained.

As described above, a combination of structures forming the dot arrangement of the color of the gamut boundary is formed from a subset of a surface structure set in the gamut structure set. If dot structures forming a pixel color signal are a subset of a surface structure set in the gamut structure set, it can be determined that the pixel color signal is a "signal for recording the color of the gamut boundary".

Figure 19:
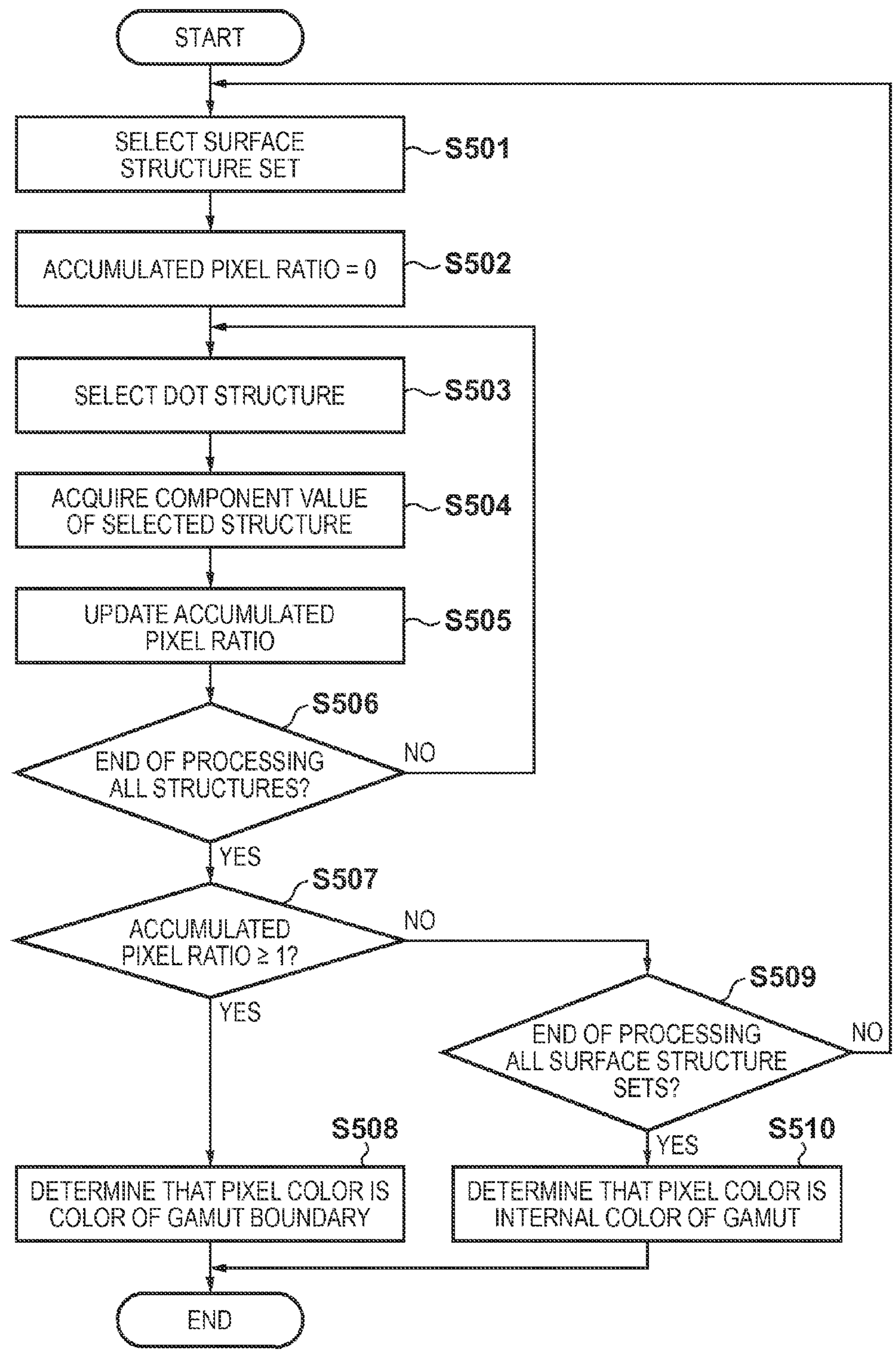
FIG. 19 is a flowchart showing determination processing of whether a pixel color signal represents the color of the gamut boundary in the first embodiment.

A pixel color signal (W, K, Y, M, C, Y/C, C/Y, C/M, M/C, M/Y, Y/M) set in correspondence with the color signal (R", B", G") of the gamut boundary in the pixel color conversion table is defined as a pixel color signal A. FIG. 19 is a flowchart showing determination processing of which of a signal for recording the color of the gamut boundary and a signal for recording the internal color of the gamut is the pixel color signal A.

First, one unprocessed surface structure set is selected from the gamut structure set (S501). Then, 0 is set in a variable representing the accumulated pixel ratio (S502).

One unprocessed dot structure is selected from the surface structure set selected in step S501 (S503). A component value regarding the dot structure selected in step S503 is acquired from the pixel color signal A (S504). The accumulated pixel ratio is updated by adding the value acquired in step S504 to the accumulated pixel ratio (S505).

It is determined whether all the structures in the surface structure set selected in step S501 have been processed (S506). If all the structures have been processed, the process advances to step S507; if an unprocessed structure remains, returns to step S503.

In step S507, it is determined whether the accumulated pixel ratio is equal to or higher than 1. If the accumulated pixel ratio is equal to or higher than 1 (substantially 1), it is determined that the pixel color signal A is a signal for recording the color of the gamut boundary, that is, an appropriate signal corresponding to the color signal (R", B", G") of the gamut boundary (S508).

If the value of the accumulated pixel ratio counter is smaller than 1 in step S507, the process advances to step S509 to determine whether all the surface structure sets in the gamut structure set have been processed. If all the surface structure sets have been processed, it is determined in step S510 that the pixel color signal A is a signal for recording the internal color of the gamut, that is, is a signal not suitable for the color signal (R", B", G") of the color of the gamut boundary. If an unprocessed surface structure set remains in step S509, the process returns to step S501.

Note that the pixel color signal which has been determined in step S510 not to be suitable for the color signal (R", B", G") of the color of the gamut boundary should be set again in the current environment of the image recording apparatus 800.

In the first embodiment, a pixel color signal determined to be a "signal for recording the color of the gamut boundary" by the above-described verification procedure is associated with the color signal (R", G", B") of the gamut boundary, thereby implementing a wide color gamut.

Note that the verification procedure shown in FIG. 19 is also applicable to setting of a pixel color signal for recording the color of the gamut boundary in the pixel color conversion table. More specifically, a pixel color signal determined in step S508 to record the color of the gamut boundary is set in correspondence with the color signal (R", G", B") of the gamut boundary.

Gamut Structure Set Setting Processing

A procedure to set a gamut structure set corresponding to the image recording apparatus 800 in the first embodiment will be explained. The above-described verification processing shown in FIG. 19 is also applicable to a gamut structure set which is set as follows.

Figure 20:
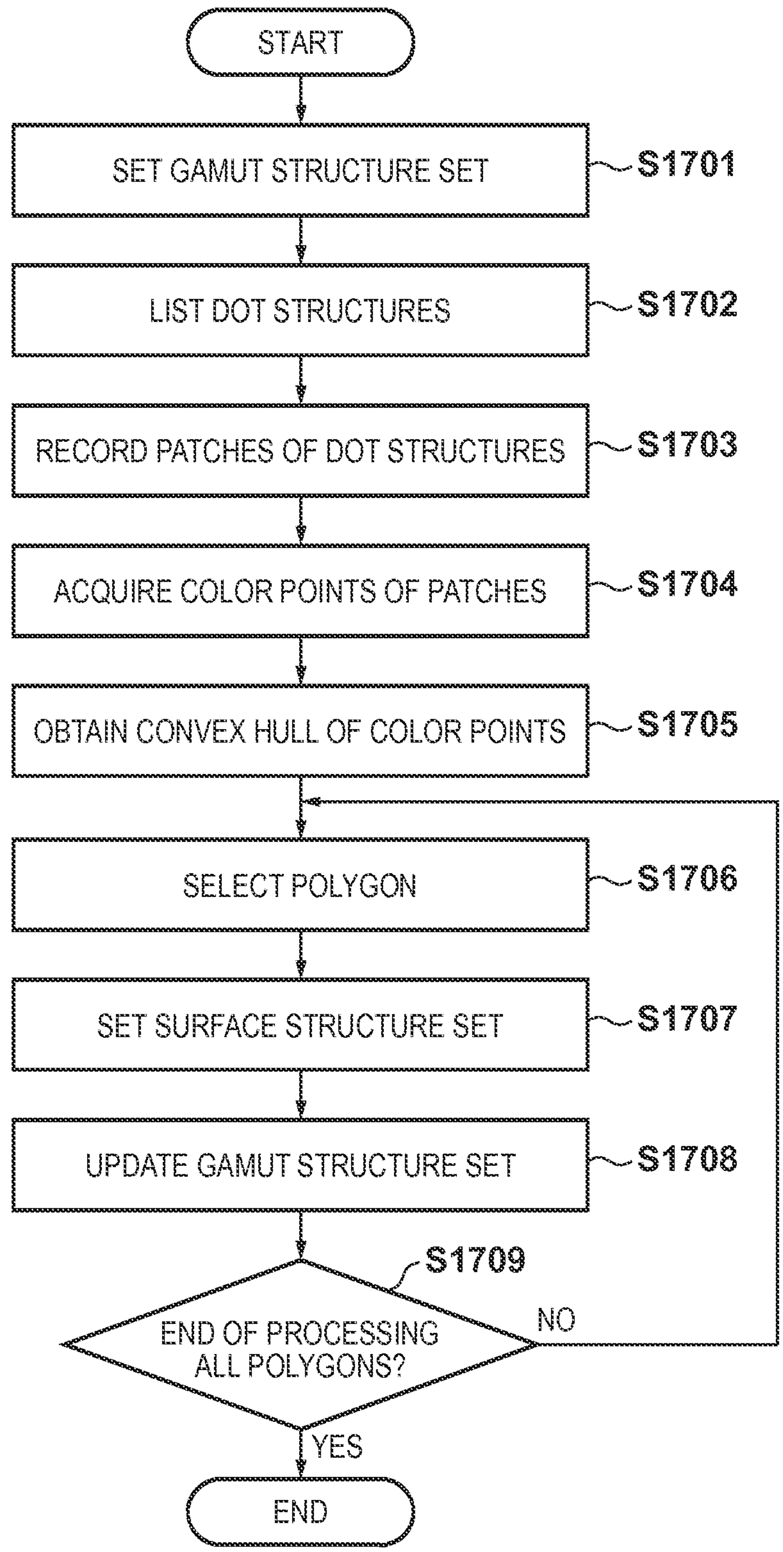
FIG. 20 is a flowchart showing a gamut structure set setting procedure in the first embodiment.

FIG. 20 is a flowchart showing gamut structure set setting processing. First, an empty set is set as the gamut structure set (S1701). Then, dot structures recordable as each pixel on a recording medium are listed (S1702). The dot structures in the first embodiment are 11 types (W, K, Y, M, C, Y/C, C/Y, C/M, M/C, M/Y, and Y/M).

Depending on the ink characteristic and the arrangement of the recording apparatus, the dot structures may include a triple overlapping structure or a double overlapping structure of inks of the same type. A dot structure in which a Y dot is arranged on a C dot, and a dot structure in which a C dot is arranged on a Y dot may be regarded as the same structure. When particular color inks of red (R), green (G), and blue (B), and light color inks of light cyan (Lc) and light magenta (Lm)

are used as color materials, overlapping structures regarding these inks are also listed. Further, when dot structures of different dot sizes for the same color material are used, overlapping structures regarding these dot structures are also listed. In this case, for example, a dot structure in which a small C dot and a large Y dot overlap each other is listed.

For each of the dot structures listed in step S1702, patches of a size capable of color measurement are recorded by a color material arrangement in which all pixels are formed from this dot structure (S1703). The patches recorded in step S1703 are measured to acquire the color point of each dot structure in the CIELAB color space (S1704). Note that the color space is not limited to the CIELAB color space, and may be the CIEXYZ color space, CAM (Color Appearance Model) JCh color space, or the like.

Then, a polyhedron serving as the convex hull of all the color points acquired in step S1704 is obtained (S1705). As the method of obtaining the convex hull, a known method such as the Graham method, Andrew method, or Quick hull method is available.

Of polygons forming the surface of the polyhedron (convex hull of color points) obtained in step S1705, one unprocessed polygon is selected (S1706). Thereafter, a surface structure set corresponding to the polygon selected in step S1706 is set (S1707). More specifically, all color points positioned inside (including sides) the polygon selected in step S1706 are extracted from the color points acquired in step S1704, and a set of dot structures corresponding to the extracted color points is set. This set of dot structures is a surface structure set on the polygon.

The gamut structure set is updated by adding, to the gamut structure set, the surface structure set which has been set in step S1707 (S1708). It is determined whether all the polygons have been processed (S1709). If all the polygons have been processed, the process ends; if an unprocessed polygon remains, returns to step S1706.

By the processing shown in the flowchart of FIG. 20, a gamut structure set corresponding to the image recording apparatus 800 according to the first embodiment is set. The verification processing shown in the flowchart of FIG. 19 is performed for the set gamut structure set.

According to the first embodiment, by controlling dot arrangement data in the color of the gamut boundary, a wide color gamut can be implemented without adding a new color material, and an image can be recorded with good color development.

In the first embodiment, dot arrangement data is generated for the color of the gamut boundary to satisfy the following conditions. First, a set of dot structures recordable in each pixel on a recording medium is defined as a set A, and a set of color points corresponding to the dot structures of the set A is defined as a set B. A polyhedron forming the convex hull of the color points of the set B is defined as a gamut polyhedron C. A set of polygons (that is, surface polygons of the gamut) forming the surface of the gamut polyhedron C is defined as a set D. For each polygon of the set D, all dot structures in which color points are positioned on the polygon are extracted from the dot structures of the set A, and a set of the extracted dot structures (that is, surface structure set) is defined as a set E. Then, dot arrangement data is generated so that dot structures represented by the dot arrangement data become a subset of the set E for the color of the gamut boundary, thereby implementing a wide color gamut.

Modification of First Embodiment

The above-described first embodiment has explained an example of implementing a widest color gamut by generating dot arrangement data so that all color signals (R", G", B") at the gamut boundary are recorded in the color of the gamut boundary. However, a color gamut wider than a conventional one can be implemented even if not all color signals at the gamut boundary are recorded in the color of the gamut boundary. For example, only part of the gamut boundary may be recorded by the dot arrangement of the color of the gamut boundary. An example in which dot arrangement data for only part of the color of the gamut boundary is controlled will be explained.

First Modification

For example, a color on a line segment connecting the vertices of adjacent chromatic colors other than black or white in the color space of color signals is set as a target color in boundary control. Dot arrangement data is generated so that the color signal (R", G", B") of the target color is recorded by the dot arrangement of the color of the gamut boundary. In FIG. 18, color signals (R", G", B") on such line segments are color signals at points (including two ends) on line segments RpYp, YpGp, GpCp, CpBp, BpMp, and MpRp.

Alternatively, a color on a line segment connecting the vertex of black and that of a chromatic color may be set as a target color. In FIG. 18, color signals (R", G", B") on such line segments are color signals at points (including two ends) on line segments RpKp, YpKp, GpKp, CpKp, BpKp, and MpKp.

Also, for example, a color on a polygon formed from the vertices of a plurality of chromatic colors and that of black may be set as a target color. In FIG. 18, color signals (R", G", B") on such polygons are color signals at points inside (including ends) tetragons KpRpYpGp, KpBpMpRp, and KpBpCpGp.

In any case, a wide color gamut is implemented by associating a pixel color signal corresponding to the dot arrangement of the color of the gamut boundary with the color signal (R", G", B") of a target color in the pixel color conversion table.

Second Modification

For example, dot arrangement data is generated so that a color which is recordable by the image recording apparatus 800 and has a highest saturation in each hue is set as a target color in boundary control, and the target color is recorded by the dot arrangement of the color of the gamut boundary. That is, only the color of part of the gamut boundary serves as a target color. In each hue, a color of a highest saturation at each lightness in this hue may be set as a target color. Further, the lightness of the target color may be restricted to values equal to or lower than a predetermined threshold (for example, 20 or lower). By restricting the lightness in this way, only dark colors serve as target colors. The threshold of the lightness may be, for example, the value of the lightness of a color having a highest saturation in each hue.

In any case, a wide color gamut is implemented by associating a pixel color signal corresponding to the dot arrangement of the color of the gamut boundary with a color signal (R", G", B") for recording a target color in the pixel color conversion table. For example, the hue is the ab hue angle ($\tan^{-1}$ a*/b*) in the CIELAB color space, and the lightness is L* in the CIELAB color space.

Second Embodiment

The above-described first embodiment has explained an example of generating dot arrangement data so that the color of the gamut boundary is recorded by a dot arrangement which records the color of a point on the surface of a gamut polyhedron. The second embodiment obtains the effect of widening the color gamut by recording the color of a point in the color gamut that is slightly inward from the surface of a gamut polyhedron, instead of recording the color of a point on the surface of the gamut polyhedron.

First, a color point which is a point inside (including sides) the surface polygon of the gamut and has a shortest distance from a color point A of a dot arrangement A serving as one of dot structures is defined as a color point B. At this time, the dot structure A in which the color difference between the color points A and B becomes equal to or smaller than 1 according to the ΔE2000 color difference formula is defined as the "neighboring structure" of the surface polygon of the gamut. A set of all neighboring structures of the surface polygon of the gamut is defined as the "surface neighboring structure set" of the surface polygon of the gamut. A set of surface neighboring structure sets corresponding to a set of surface polygons of the gamut forming a gamut polyhedron is defined as a "quasi-gamut structure set".

Figure 21:
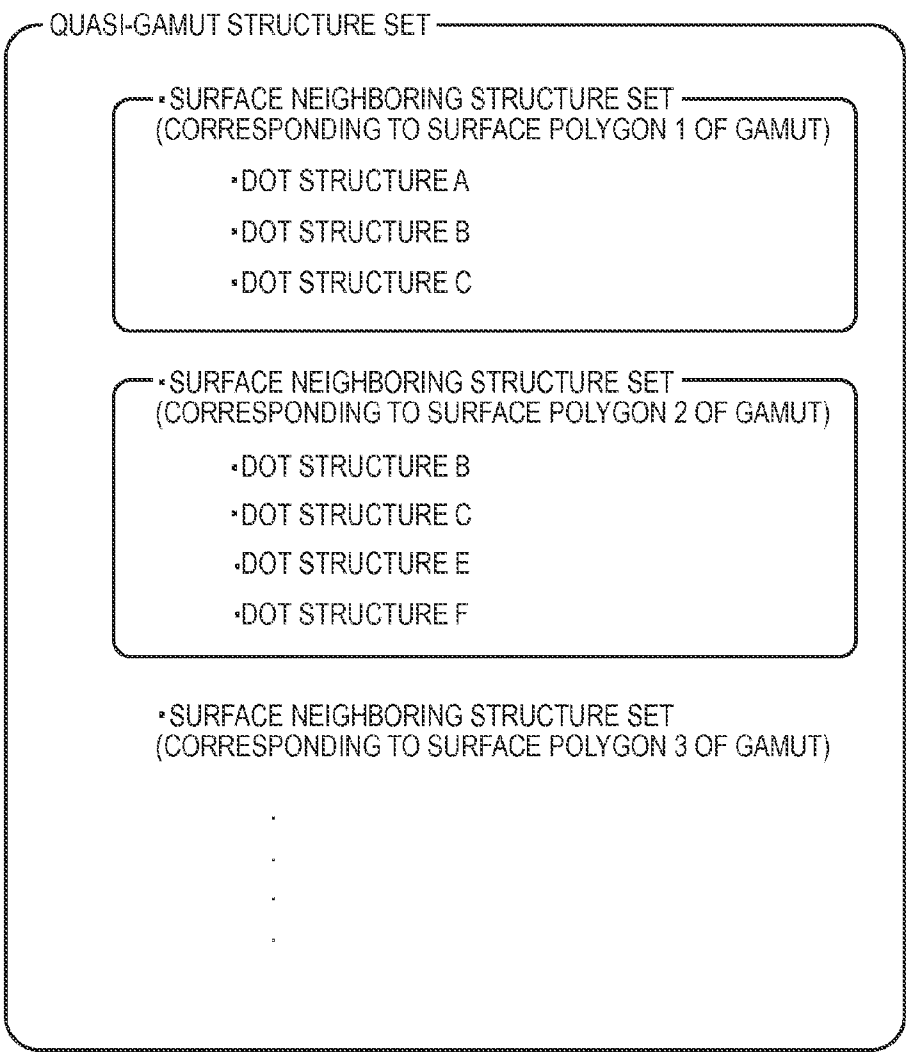
FIG. 21 is a view showing the relationship between a quasi-gamut structure set and a surface neighboring structure set in the second embodiment.

FIG. 21 shows the relationship between the quasi-gamut structure set and the surface neighboring structure set. As shown in FIG. 21, the surface neighboring structure set is a set of dot structures, and the quasi-gamut structure set is a set of surface neighboring structure sets. One surface polygon of the gamut corresponds to one surface neighboring structure set, and the surface neighboring structure set is formed from all dot structures satisfying the following conditions. That is, when the color point of the dot structure is defined as the color point A, and a color point which is positioned inside a corresponding surface polygon of the gamut and has a shortest distance from the color point A is defined as the color point B, the color difference between the color points A and B becomes equal to or smaller than 1 at ΔE2000. The quasi-gamut structure set is formed from surface neighboring structure sets regarding all the surface polygons of the gamut for the gamut polyhedron.

In the second embodiment, in a surface neighboring structure set, a dot arrangement in which the total number of pixels where structures included in this surface neighboring structure set are arranged becomes four or more times of the total number of pixels where other structures are arranged is defined as a gamut boundary color dot arrangement. A color recorded by the gamut boundary color dot arrangement is the color of the surface of the gamut polyhedron or that of its neighborhood. A wider color gamut than by a conventional technique can be implemented by recording the color of the gamut boundary by the gamut boundary color dot arrangement.

In the second embodiment, dot arrangement data is generated so that the color of the gamut boundary is recorded by the gamut boundary color dot arrangement. Note that the arrangement except for a pixel color conversion table stored in a pixel color conversion table storage unit 909 is the same as that in the first embodiment, and a description thereof will not be repeated.

Pixel Color Conversion Table

The pixel color conversion table in the second embodiment stores a pixel color signal corresponding to a color signal (R", G", B"), similar to the first embodiment. However, unlike the first embodiment, the pixel color conversion table associates, with the color signal (R", G", B") of the gamut boundary, a pixel color signal corresponding to the gamut boundary color dot arrangement.

Verification of Pixel Color Signal Corresponding to Color of Gamut Boundary

A procedure to verify whether a pixel color signal set in correspondence with the dot arrangement of the color of the gamut boundary in the pixel color conversion table according to the second embodiment is appropriate will be described. A pixel color signal (W, K, Y, M, C, Y/C, C/Y, C/M, M/C, M/Y, Y/M) set in correspondence with the color signal (R", G", B") of the gamut boundary in the pixel color conversion table is defined as a pixel color signal A. FIG. 22 is a flowchart showing determination processing of whether the pixel color signal A is a signal corresponding to the dot arrangement of the color of the gamut boundary.

First, one unprocessed surface neighboring structure set is selected from the quasi-gamut structure set (S2101). Then, 0 is set in a variable representing the accumulated pixel ratio (S2102).

One unprocessed dot structure is selected from the surface neighboring structure set selected in step S2101 (S2103). A component value regarding the dot structure selected in step S2103 is acquired from the pixel color signal A (S2104). The accumulated pixel ratio is updated by adding the value acquired in step S2104 to the accumulated pixel ratio (S2105).

It is determined whether all the structures in the surface neighboring structure set selected in step S2101 have been processed (S2106). If all the structures have been processed, the process advances to step S2107; if an unprocessed structure remains, returns to step S2103.

In step S2107, it is determined whether the value of the accumulated pixel ratio is equal to or higher than 0.8. If the accumulated pixel ratio is equal to or higher than 0.8, the total number of pixels where the structures of the surface neighboring structure set are arranged becomes four or more times of the total number of pixels where other structures are arranged. It is therefore determined that the color of the pixel color signal A is represented by a signal corresponding to the gamut boundary color dot arrangement (S2108).

If the value of the accumulated pixel ratio is lower than 0.8 in step S2107, the process advances to step S2109 to determine whether all the surface neighboring structure sets in the quasi-gamut structure set have been processed. If all the surface neighboring structure sets have been processed, it is determined in step S2110 that the pixel color signal A is a signal not corresponding to the gamut boundary color dot arrangement. If an unprocessed surface neighboring structure set remains in step S2109, the process returns to step S2101.

In the second embodiment, a pixel color signal determined to be a "signal corresponding to the gamut boundary color dot arrangement" by the above-described verification procedure is associated with the color signal (R", G", B") of the gamut boundary, thereby implementing a wide color gamut.

Note that the verification procedure shown in FIG. 22 is also applicable to setting of a pixel color signal for recording the color of the gamut boundary in the pixel color conversion table. More specifically, a pixel color signal determined in step S2108 to correspond to the gamut boundary color dot arrangement is set in correspondence with the color signal (R", G", B") of the gamut boundary.

Quasi-Gamut Structure Set Setting Processing

A procedure to set a quasi-gamut structure set in the second embodiment will be explained. The above-described verification processing shown in FIG. 22 is also applicable to a quasi-gamut structure set which is set as follows.

Figure 23A:
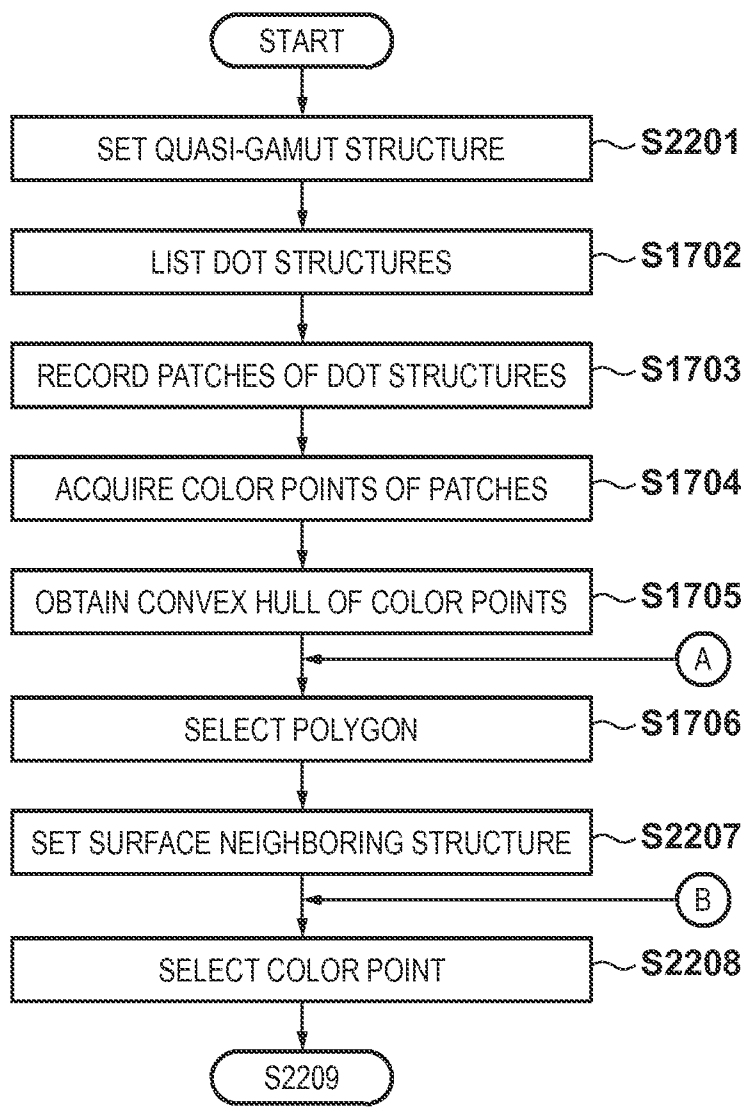
FIGS. 23A and 23B are flowcharts showing a quasi-gamut structure set setting procedure in the second embodiment.
Figure 23B:
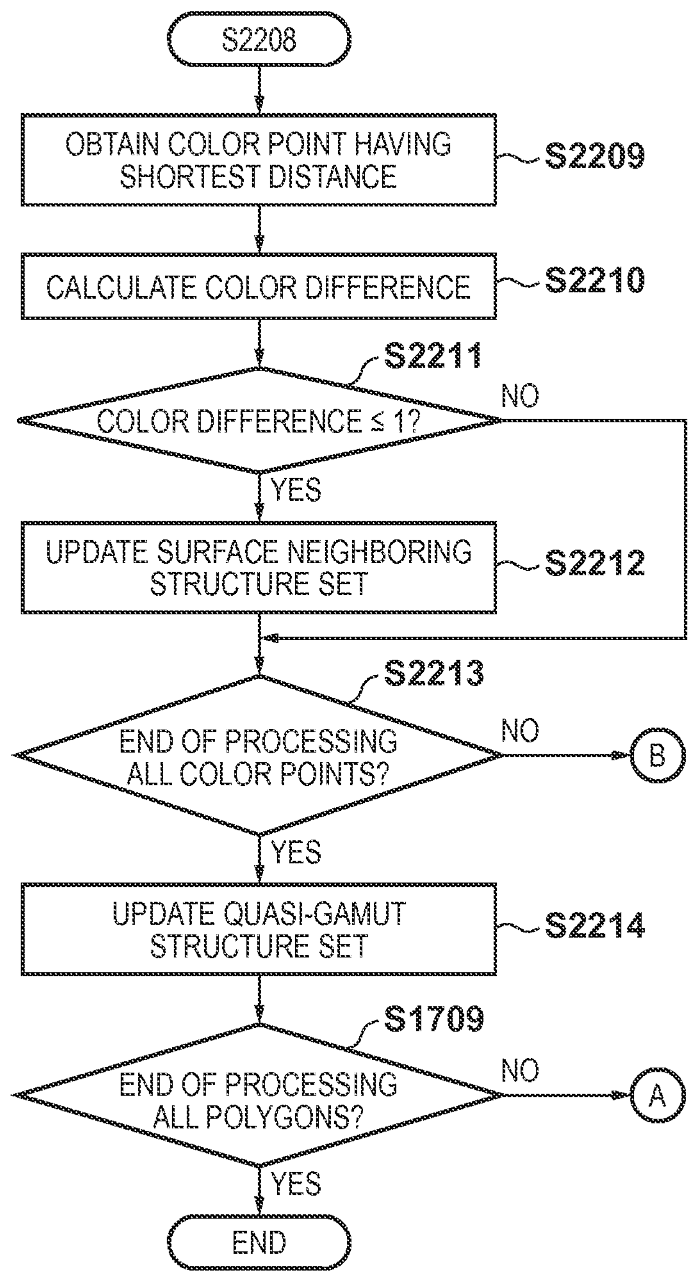

FIGS. 23A and 23B are flowcharts showing quasi-gamut structure set setting processing. The same reference numerals as those in the gamut structure set setting processing according to the first embodiment shown in FIG. 20 denote the same processes, and a detailed description thereof will not be repeated.

First, an empty set is set as the quasi-gamut structure set (S2201). Then, dot structures recordable as each pixel on a recording medium are listed (S1702). For each of the dot structures listed in step S1702, patches are recorded (S1703). The patches recorded in step S1703 are measured to acquire the color point of each dot structure (S1704). Then, a polyhedron serving as the convex hull of all the color points acquired in step S1704 is obtained (S1705). Of polygons forming the surface of the polyhedron obtained in step S1705, one unprocessed polygon is selected (S1706).

Thereafter, an empty set is set as the surface neighboring structure set (S2207). Then, one unprocessed color point is selected from the color points acquired in step S1704 (S2208). Of color points inside the polygon selected in step S1706, a color point having a shortest distance from the color point set in step S2208 is obtained.

The color difference between the color point selected in step S2208 and the color point obtained in step S2209 is calculated according to the ΔE2000 color difference formula (S2210). It is determined whether the color difference calculated in step S2210 is equal to or smaller than 1 (S2211). If the color difference is equal to or smaller than 1, the process advances to step S2212; if it exceeds 1, to step S2213.

In step S2212, the surface neighboring structure set is updated by adding, to the surface neighboring structure set, a dot structure corresponding to the color point selected in step S2208. In step S2213, it is determined whether all the color points acquired in step S1704 have been processed. If all the color points have been processed, the process advances to step S2214; if an unprocessed color point remains, returns to step S2208.

In step S2214, the quasi-gamut structure set is updated by adding the surface neighboring structure set to the quasi-gamut structure set. It is determined whether all the polygons have been processed (S1709). If all the polygons have been processed, the process ends; if an unprocessed polygon remains, returns to step S1706.

By the processing shown in the flowcharts of FIGS. 23A and 23B, a quasi-gamut structure set corresponding to an image recording apparatus 800 according to the second embodiment is set. The verification processing shown in the flowchart of FIG. 22 is performed for the set quasi-gamut structure set.

According to the second embodiment, dot arrangement data is generated for the color of the gamut boundary to satisfy the following conditions. First, a set of dot structures recordable in each pixel on a recording medium is defined as a set A, and a set of color points of the dot structures of the set A is defined as a set B. A polyhedron forming the convex hull of the color points of the set B is defined as a polyhedron C. A set of polygons forming the surface of the polyhedron C is defined as a set D. For each polygon of the set D, a set of structures which are dot structures of the set A and satisfy the following conditions is defined as a set G. More specifically, the color point of the dot structure is defined as a color point E. A color point which is a point inside (including sides) the polygon and has a shortest distance from the color point E is defined as a color point F. A set of dot structures in which the color difference between the color points E and F becomes equal to or smaller than 1 at ΔE2000 is defined as a set G. At this time, dot arrangement data is generated so that the total number of pixels having dot structures of the set G becomes four or more times of the total number of pixels having dot structures not included in the set G in dot structures represented by dot arrangement data of the color of the gamut boundary. In this fashion, a wide color gamut can be implemented without adding a new color material, and an image can be recorded with good color development.

Modification of Second Embodiment

The above-described second embodiment has explained an example of generating dot arrangement data so that all color signals (R", G", B") at the gamut boundary are recorded by the gamut boundary color dot arrangement. However, a color gamut wider than a conventional one can be implemented even if only part of the color of the gamut boundary is recorded by the gamut boundary color dot arrangement. Dot arrangement data for only part of the color of the gamut boundary can be controlled, similar to the modification of the above-described first embodiment.

Modification of Embodiments

The above-described embodiments have described an example in which the background structure, a structure in which a dot of a single color is arranged, and a structure in which dots of a plurality of colors are arranged to overlap each other are targeted as dot structures. However, these dot structures may include a structure in which a plurality of dots are arranged side by side.

The above-described embodiments have exemplified 4-pass recording. However, the number of main scans is not limited to four, and the present invention is similarly applicable to, for example, an arrangement in which recording is performed by two or eight main scans. The present invention is also effectively applicable to a full-line type inkjet printer which does not perform main scanning. Further, the present invention is applicable to an image recording apparatus of another recording method such as an electrophotographic printer or sublimation printer. In this case, toner, an ink ribbon, or the like is used as the color material, instead of ink.

The above-described embodiments have explained an example of generating dot arrangement data by using the pixel color conversion table. However, dot arrangement data may be generated by another method as long as dot arrangement data represents the color of the gamut boundary or the dot arrangement of the color of the gamut boundary.

The above-described embodiments have described an example of applying the present invention to an image recording system which is a combination of a host computer and image recording apparatus. However, the present invention may take the form of an image recording apparatus used as the image output terminal of an information processing device such as a computer. Also, the present invention may take the form of a copying machine combined with a reader or the like, or the form of a facsimile apparatus having transmission and reception functions.

The colors of color materials are not limited to those in the embodiment, and an ink of another color such as colorless clear ink may be used. The present invention is also applicable to mono-color printing using only three or less types of color materials.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-125142 filed May 31, 2012 which is hereby incorporated by reference herein in its entirety.

What is claimed is:

1. A color processing method of performing image processing for an image recording apparatus which records an image by arranging, on a recording medium, dots of a plurality of types of dot structures having different arrangements of color materials to be used, comprising the steps of:

generating a dot arrangement signal which corresponds to an input color signal and represents an arrangement of dots of the plurality of types of dot structures; and outputting image data which arranges dots of the plurality of types of dot structures on a recording medium based on the dot arrangement signal, wherein, in a case where a set of dot structures recordable by the image recording apparatus is defined as a set A, a set of color points corresponding to the respective dot structures of the set A is defined as a set B, a polyhedron forming a convex hull of the color points of the set B in a color space is defined as a polyhedron C, a set of polygons forming a surface of the polyhedron C is defined as a set D, and a set of dot structures in which color points are positioned on the polygons of the set D out of the dot structures of the set A is defined as a set E, the dot arrangement signal out of the dot arrangement signals that corresponds to a color signal value representing a color capable of output on a gamut boundary represents an arrangement of dot structures serving as a subset of the set E.

2. A non-transitory computer readable medium storing program for causing a computer to perform the color processing method according to claim 1.

3. A color processing apparatus for performing image processing for an image recording apparatus which records an image by arranging, on a recording medium, dots of a plurality of types of dot structures having different arrangements of color materials to be used, comprising:

a storage unit configured to store a table indicating a relationship between an input color, and a dot arrangement signal which corresponds to the input color signal and represents an arrangement of dots of the plurality of types of dot structures, wherein the dot arrangement signal out of the dot arrangement signals that corresponds to a color signal value representing a color capable of output on a gamut boundary representing, in a case where a set of dot structures recordable by the image recording apparatus is defined as a set A, a set of color points corresponding to the respective dot structures of the set A is defined as a set B, a polyhedron forming a convex hull of the color points of the set B in a color space is defined as a polyhedron C, a set of polygons forming a surface of the polyhedron C is defined as a set D, and a set of dot structures in which color points are positioned on the polygons of the set D out of the dot structures of the set A is defined as a set E, an arrangement of dot structures serving as a subset of the set E;

a generation unit configured to generate a dot arrangement signal which corresponds to an input color signal of an image referring to the table stored in the storage unit; and an outputting unit configured to output image data which arranges dots of the plurality of types of dot structures on a recording medium based on the dot arrangement signal generated by the generation unit.

4. The apparatus according to claim 3, wherein the image recording apparatus comprises an ink jet printer.

* * * * *